United States Patent
Menon et al.

(10) Patent No.: US 12,501,489 B2
(45) Date of Patent: Dec. 16, 2025

(54) RACH OPTIMIZATION FOR NB-IoT NTN GSO

(71) Applicant: QUALCOMM Incorporated, San Diego, CA (US)

(72) Inventors: Srikanth Menon, Bangalore (IN); Raghuveer Ramakrishna Srinivas Tarimala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 18/318,631

(22) Filed: May 16, 2023

(65) Prior Publication Data

US 2024/0389154 A1 Nov. 21, 2024

(51) Int. Cl.
*H04W 74/0833* (2024.01)
*H04B 7/185* (2006.01)

(52) U.S. Cl.
CPC .... *H04W 74/0833* (2013.01); *H04B 7/18513* (2013.01)

(58) Field of Classification Search
CPC .............. H04W 74/0833; H04W 84/06; H04B 7/18513
See application file for complete search history.

(56) References Cited

U.S. PATENT DOCUMENTS

| | | | |
|---|---|---|---|
| 2009/0175253 A1* | 7/2009 | Wu | H04W 99/00 370/338 |
| 2012/0082088 A1* | 4/2012 | Dalsgaard | H04W 74/0875 370/315 |
| 2021/0076416 A1* | 3/2021 | Shah | H04W 74/085 |
| 2021/0289558 A1* | 9/2021 | Han | H04W 56/0015 |
| 2022/0053557 A1* | 2/2022 | You | H04W 74/0858 |
| 2023/0209386 A1* | 6/2023 | Khoshkholgh Dashtaki | H04W 24/10 370/350 |
| 2023/0328798 A1* | 10/2023 | He | H04W 74/0833 370/329 |

OTHER PUBLICATIONS

International Search Report and Written Opinion—PCT/US2024/024651—ISA/EPO—Sep. 16, 2024.

(Continued)

*Primary Examiner* — Liem H. Nguyen
(74) *Attorney, Agent, or Firm* — Arent Fox Schiff, LLP

(57) ABSTRACT

This disclosure provides methods, components, devices and systems for optimized RACH procedures in NTNs including NB-IoT. A UE performs in an NTN one or more of a first or second procedure in an idle mode, or a third procedure in a connected mode. In the first procedure, the UE considers a number of RAPIDs in msg2, and if the number meets a threshold, the UE applies a backoff to delay sending msg1. In the second procedure, if the UE fails to decode msg2 or msg4 after transmitting msg1, the UE applies a backoff before performing subsequent RACH. In the third procedure, following a failure to receive an uplink grant when monitoring a USS and after transmitting msg1 for a SR, the UE continues monitoring the USS for the grant until the start of a RAR window. If the uplink grant is received during this time, the UE cancels msg2 monitoring.

27 Claims, 10 Drawing Sheets

(56) References Cited

OTHER PUBLICATIONS

Fraunhofer Iis, et al., "RAR Window Offset", 3GPP TSG-RAN WG1 e-Meeting #105, R1-2105503, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 11, 2021, 5 Pages, XP052006390, section 5.

Huawei, et al., "Random Access Without Location Information", 3GPP TSG-RAN WG2 Meeting 107Bis, R2-1913784 (Update of R2-1911233), 3rd Generation Partnership Project, Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, 5 Pages, XP051791775, p. 1.

Partial International Search Report—PCT/US2024/024651—ISA/EPO—Jul. 24, 2024.

* cited by examiner

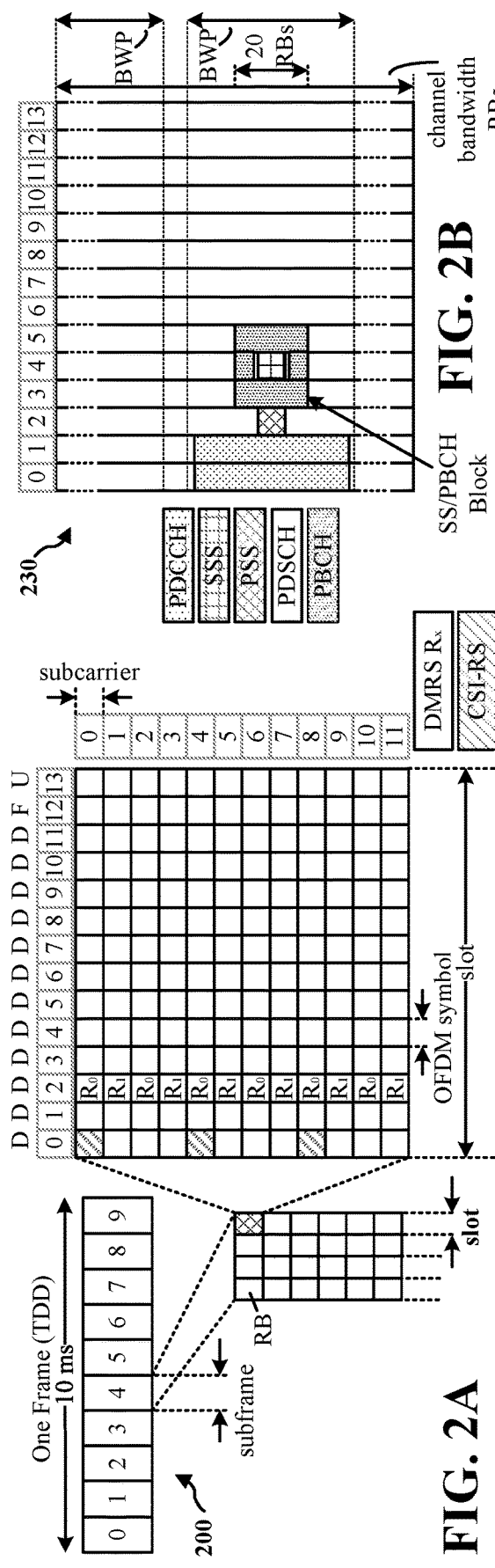
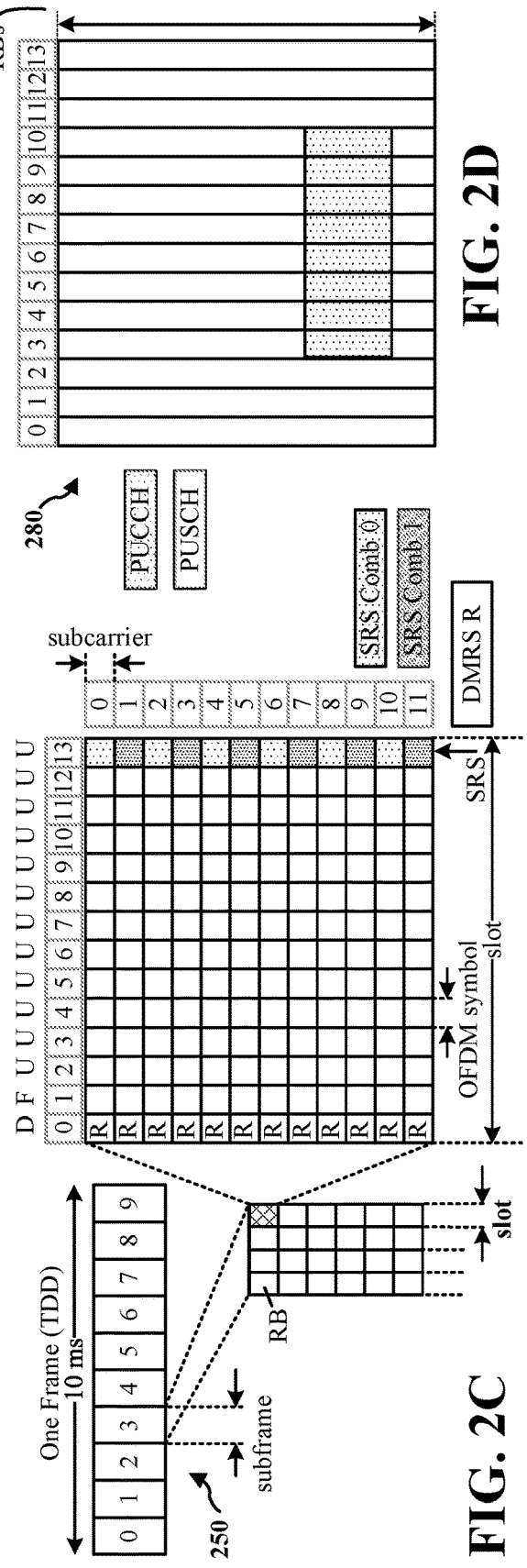
FIG. 2A
FIG. 2B
FIG. 2C
FIG. 2D

RACH OPTIMIZATION FOR NB-IoT NTN GSO

TECHNICAL FIELD

The present disclosure generally relates to wireless communication in random access channel (RACH) procedures for non-terrestrial networks (NTNs), and more particularly, to a wireless communication system optimizing RACH procedures in narrowband Internet of Things (NB-IoT) NTN deployments including geosynchronous orbit (GSO) satellites.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented in a method for wireless communication performable at a user equipment (UE). The method includes performing, in a non-terrestrial network (NTN), one or more of a first procedure in an idle mode, a second procedure in the idle mode, or a third procedure in a connected mode. The first procedure includes receiving a first random access response (RAR), and transmitting a first random access channel (RACH) preamble after a first backoff duration in response to the first RAR including one or more random access preamble identifiers (RAPIDs) meeting or exceeding a threshold quantity of RAPIDs. The second procedure includes transmitting a second RACH preamble, and transmitting another RACH preamble after a second backoff duration in response to a failure to decode a second RAR responsive to transmission of the second RACH preamble, or in response to a failure to decode a contention resolution message following reception of the second RAR. The third procedure includes monitoring a user-specific search space (USS) for an uplink grant during a monitoring period, transmitting a third RACH preamble in response to a failure to receive the uplink grant during the monitoring period, and continuing to monitor the USS for the uplink grant after transmitting the third RACH preamble until a start time of a RAR window for a third RAR responsive to the third RACH preamble.

Another innovative aspect of the subject matter described in this disclosure can be implemented in an apparatus for wireless communication, such as a UE. The apparatus includes a memory, and a processor communicatively coupled with the memory. The processor is operable to cause the apparatus to perform, in a NTN, one or more of a first procedure in an idle mode, a second procedure in the idle mode, or a third procedure in a connected mode. In the first procedure, the processor is operable to cause the apparatus to receive a first RAR, and to transmit a first RACH preamble after a first backoff duration in response to the first RAR including one or more RAPIDs meeting or exceeding a threshold quantity of RAPIDs. In the second procedure, the processor is operable to cause the apparatus to transmit a second RACH preamble, and to transmit another RACH preamble after a second backoff duration in response to a failure to decode a second RAR responsive to transmission of the second RACH preamble, or in response to a failure to decode a contention resolution message following reception of the second RAR. In the third procedure, the processor is operable to cause the apparatus to monitor a USS for an uplink grant during a monitoring period, to transmit a third RACH preamble in response to a failure to receive the uplink grant during the monitoring period, and to continue to monitor the USS for the uplink grant after transmitting the third RACH preamble until a start time of a RAR window for a third RAR responsive to the third RACH preamble.

Another innovative aspect of the subject matter described in this disclosure can be implemented in an apparatus for wireless communication, such as a UE. The apparatus includes means for performing, in a NTN, one or more of a first procedure in an idle mode, a second procedure in the idle mode, or a third procedure in a connected mode. In the first procedure, the means for performing is configured to receive a first RAR, and to transmit a first RACH preamble after a first backoff duration in response to the first RAR including one or more RAPIDs meeting or exceeding a threshold quantity of RAPIDs. In the second procedure, the means for performing is configured to transmit a second RACH preamble, and to transmit another RACH preamble after a second backoff duration in response to a failure to decode a second RAR responsive to transmission of the second RACH preamble, or in response to a failure to decode a contention resolution message following reception of the second RAR. In the third procedure, the means for performing is configured to monitor a USS for an uplink grant during a monitoring period, to transmit a third RACH preamble in response to a failure to receive the uplink grant during the monitoring period, and to continue to monitor the USS for the uplink grant after transmitting the third RACH preamble until a start time of a RAR window for a third RAR responsive to the third RACH preamble.

Another innovative aspect of the subject matter described in this disclosure can be implemented in a non-transitory, computer-readable medium comprising computer executable code. The code when executed by a processor causes the processor to perform, in a NTN, one or more of a first procedure in an idle mode, a second procedure in the idle mode, or a third procedure in a connected mode. In the first procedure, the code when executed by the processor causes the processor to receive a first RAR, and to transmit a first RACH preamble after a first backoff duration in response to the first RAR including one or more RAPIDs meeting or exceeding a threshold quantity of RAPIDs. In the second procedure, the code when executed by the processor causes the processor to transmit a second RACH preamble, and to transmit another RACH preamble after a second backoff duration in response to a failure to decode a second RAR responsive to transmission of the second RACH preamble, or in response to a failure to decode a contention resolution message following reception of the second RAR. In the third procedure, the code when executed by the processor causes the processor to monitor a USS for an uplink grant during a monitoring period, to transmit a third RACH preamble in response to a failure to receive the uplink grant during the monitoring period, and to continue to monitor the USS for the uplink grant after transmitting the third RACH preamble until a start time of a RAR window for a third RAR responsive to the third RACH preamble.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first subframe within a 5G NR frame structure.

FIG. 2B is a diagram illustrating an example of DL channels within a 5G NR subframe.

FIG. 2C is a diagram illustrating an example of a second subframe within a 5G NR frame structure.

FIG. 2D is a diagram illustrating an example of UL channels within a 5G NR subframe.

DETAILED DESCRIPTION

Figure 1:
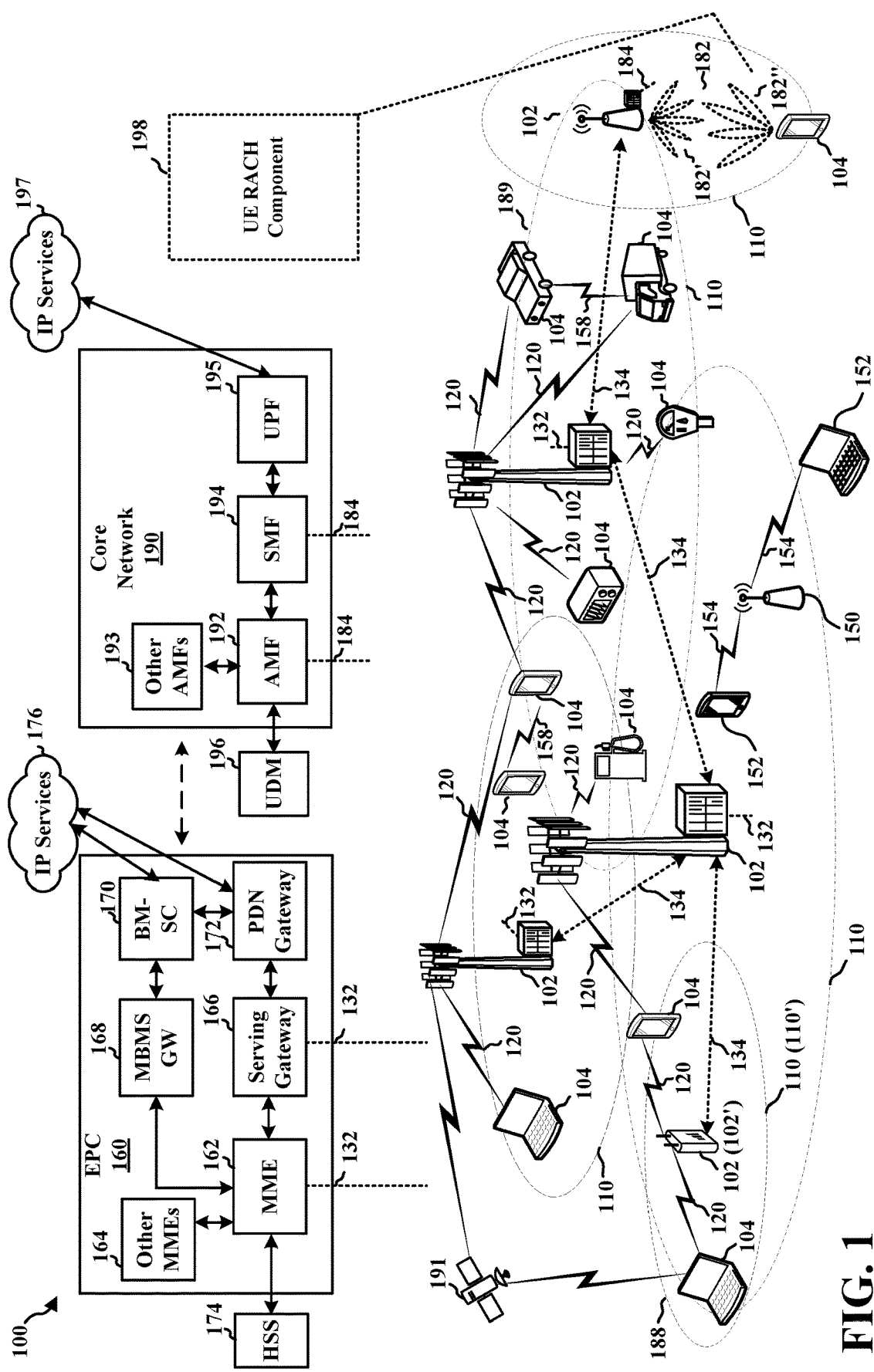
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects generally relate to random access channel (RACH) procedures in non-terrestrial network (NTN) deployments. More particularly, aspects specifically relate to optimization of RACH procedures to result in fewer RACH attempts per UE connection request in NTN narrowband internet of things (NB-IoT) deployments. In a first example, a UE may perform random access response (RAR) sniffing to detect a current load of the network at a given point of time. In particular, the UE may consider a number of random access preamble identifiers (RAPIDs) in a single RAR as an indicator of the current RACH load on the network. Depending on the network load, the UE may either send message 1 in a RACH procedure or apply a backoff to delay sending message 1 to reduce the likelihood of collisions. In a second example, if a UE fails a RACH attempt after transmitting a preamble in one physical random access channel (PRACH) occasion, for example, in response to failing to decode a RAR or a contention resolution message in RACH due to deep fading or network congestion, then the UE may apply a backoff before performing a subsequent RACH attempt. For instance, rather than immediately transmitting another preamble in a next PRACH occasion during a subsequent RACH attempt when the cause of the RACH failure may still persist, the UE may refrain from sending message 1 in a subsequent RACH attempt until after a randomized backoff duration has passed. In a third example, when the UE is already in a connected mode following a prior RACH attempt and has initiated another RACH procedure for a scheduling request (SR) in NB-IoT, the UE may monitor a user-specific search space (USS) for a possible delayed uplink grant between the time the UE transmitted message 1 and before the beginning of a RAR window for monitoring message 2. If the UE receives an uplink grant in the USS during this time, the UE may abort the RACH procedure since the SR is no longer necessary.

Particular aspects of the subject matter described in this disclosure can be implemented to realize one or more of the following potential advantages. By optimizing the RACH procedure according to any of the first, second, or third aforementioned examples, the non-negligible rate of RACH failures that tends to occur in NTNs may be minimized, and delay and transmission power penalties may be significantly reduced in NTN NB-IoT deployments. With respect to the first example where a backoff is applied based on a current number of RAPIDs in a RAR, this approach reduces the likelihood of the network including RACH failures and allows the UE to anticipate current network congestion without inefficiently consuming and ramping power to a maximum level in its uplink transmissions. With respect to the second example where a backoff is applied before performing a subsequent RACH attempt in response to a failure to receive message 2 or message 4, this approach allows the UE to minimize the likelihood of a deep fade, persistent network congestion, or similar scenario from continuing to affect subsequent RACH attempts and thereby results in reduced probability of continuing RACH failures. With respect to the third example where the UE monitors a USS for a possible delayed uplink grant between a timing of message 1 and message 2, this approach allows the UE to obtain uplink resources to communicate with a base station in lieu of an SR without first having to succeed in one of possibly multiple RACH attempts, thus minimizing delays in uplink transmission and transmission power consumption in RACH procedures.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as base station 102 may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station may utilize beamforming 182 with the UE 104 to compensate for the path loss and short range. The base station 102 and the UE 104 may each include a plurality of antennas, such as antenna elements, antenna panels, and/or antenna arrays to facilitate the beamforming.

The base station 102 may transmit a beamformed signal to the UE 104 in one or more transmit directions 182'. The UE 104 may receive the beamformed signal from the base station 102 in one or more receive directions 182". The UE 104 may also transmit a beamformed signal to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, cNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communications system and access network 100 may be or include a non-terrestrial network (NTN), a terrestrial network (TN), or a combination of non-terrestrial and terrestrial networks. An NTN is a network involving non-terrestrial flying objects, and may include, but is not limited to, a satellite communication network, a high-altitude platform system (HAPS), or an air-to-ground network, among other networks. Thus, a cell in an NTN may be served by a spaceborne platform such as a low Earth orbiting (LEO) satellite, a medium Earth orbiting (MEO) satellite, or a geosynchronous Earth orbiting (GEO) satellite, an airborne platform such as an International Mobile Telecommunications base station (HIBS), a ground station having antennas up-tilted towards the sky for providing in-flight connectivity, or other base station or network entity providing NTN connectivity. In contrast, a TN is a network that does not involve satellites or other such non-terrestrial flying objects. Thus, a cell in a TN may be served by a ground station or other network entity that provides terrestrial coverage to UEs. In the example wireless communications system and access network 100 of FIG. 1. NTN cells 188, TN cells 189, or both NTN cells 188 and TN cells 189, may be provided. For example, at least one coverage area 110 or cell may be an NTN cell 188 in which base station 102 provides non-terrestrial coverage to UEs 104 via satellite 191. Alternatively or additionally, at least one other coverage area 110 or cell may be a TN cell 189 in which base station 102 provides terrestrial coverage to UEs 104 (without a satellite intermediary).

In certain aspects, the UE 104 may include a UE RACH component 198 that is configured to perform, in an NTN, one or more of a first procedure in an idle mode, a second procedure in the idle mode, or a third procedure in a connected mode. In one aspect, the UE RACH component 198 is configured, in the first procedure, to receive a first RAR, and to transmit a first RACH preamble after a first backoff duration in response to the first RAR including one or more RAPIDs meeting or exceeding a threshold quantity of RAPIDs. In another aspect, the UE RACH component 198 is configured, in the second procedure, to transmit a second RACH preamble, and to transmit another RACH preamble after a second backoff duration in response to a failure to decode a second RAR responsive to transmission of the second RACH preamble, or in response to a failure to decode a contention resolution message following reception of the second RAR. In a further aspect, the UE RACH component 198 is configured, in the third procedure, to monitor a USS for an uplink grant during a monitoring period, to transmit a third RACH preamble in response to a failure to receive the uplink grant during the monitoring period, and to continue to monitor the USS for the uplink grant after transmitting the third RACH preamble until a start time of a RAR window for a third RAR responsive to the third RACH preamble. In other aspects, the UE RACH component 198 may be configured to perform a combination of two or more of the first procedure, second procedure, and third procedure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^u \cdot 15$ kilohertz (kHz), where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data and may additionally be used to carry a buffer status report (BSR), a power headroom report (PHR), and/or UCI.

Figure 3:
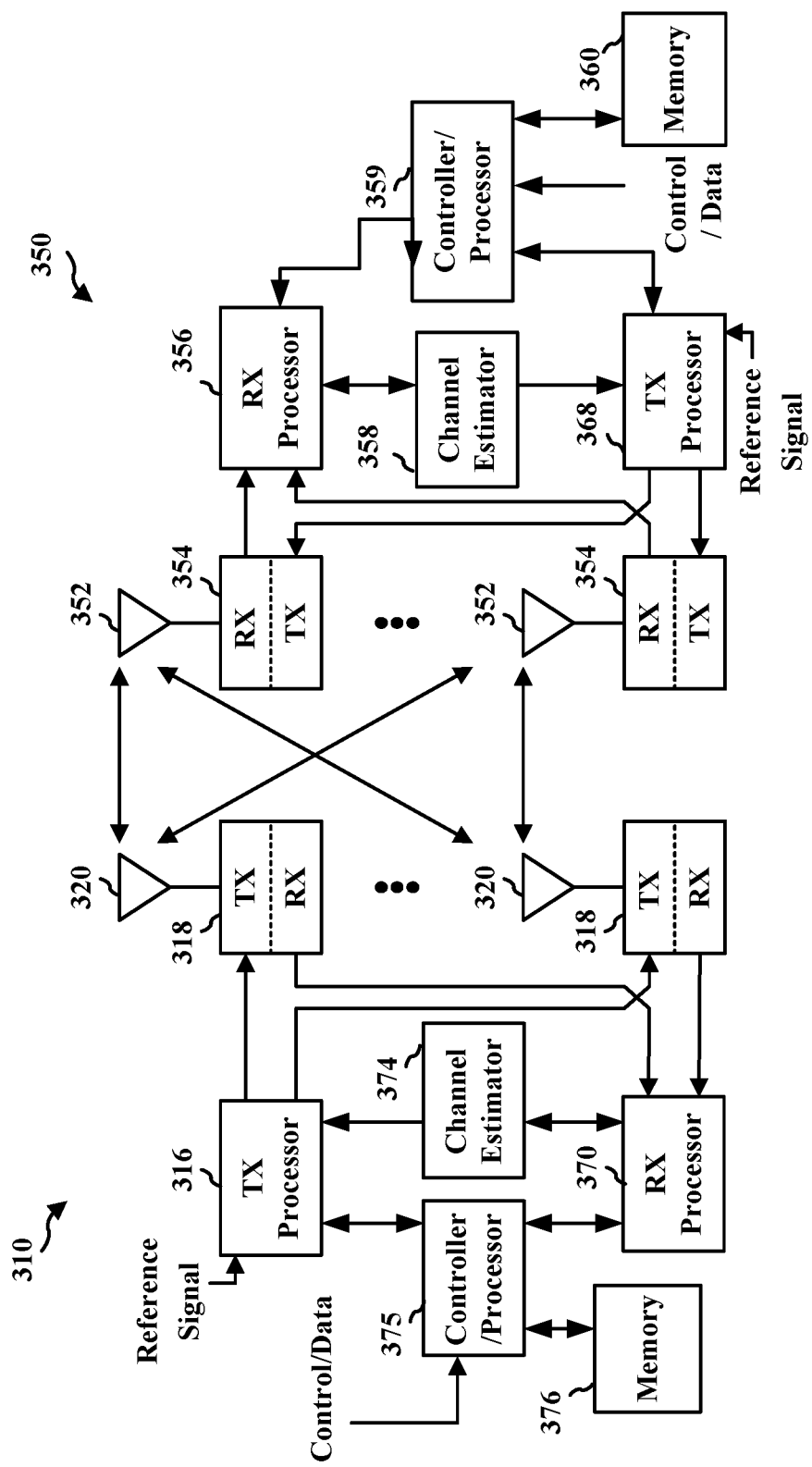
FIG. 3 is a block diagram of a base station (BS) in communication with a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE RACH component 198 of FIG. 1.

The wireless communication system and access network 100 including UEs 104, 350 and base stations 102, 310 may provide support for IoT devices and other UEs in machine type communication (MTC). One such MTC technology is narrowband Internet of Things (NB-IoT), which utilizes a system bandwidth of 180 kHz encompassing a single resource block for communication. To account for this reduced system bandwidth compared to LTE or NR technologies supporting wider bandwidths, various physical channels dedicated to NB-IoT may be used for uplink and downlink communication, including a narrowband physical random access channel (NPRACH), a narrowband physical uplink shared channel (NPUSCH), a narrowband physical downlink shared channel (NPDSCH), a narrowband downlink control channel (NPDCCH), and a narrowband physical broadcast channel (NPBCH). These narrower bandwidth channels may be used respectively for similar purposes as their wider bandwidth counterparts (i.e., PRACH, PUSCH, PDSCH, PDCCH, and PBCH respectively). Additionally, NB-IoT provides for various repetition and coverage enhancement techniques to provide wide service area coverage to low power UEs. For example, these UEs may repeat uplink transmissions to serving base stations a given number of times depending on their respectively associated path loss or coverage enhancement levels.

Figure 4:
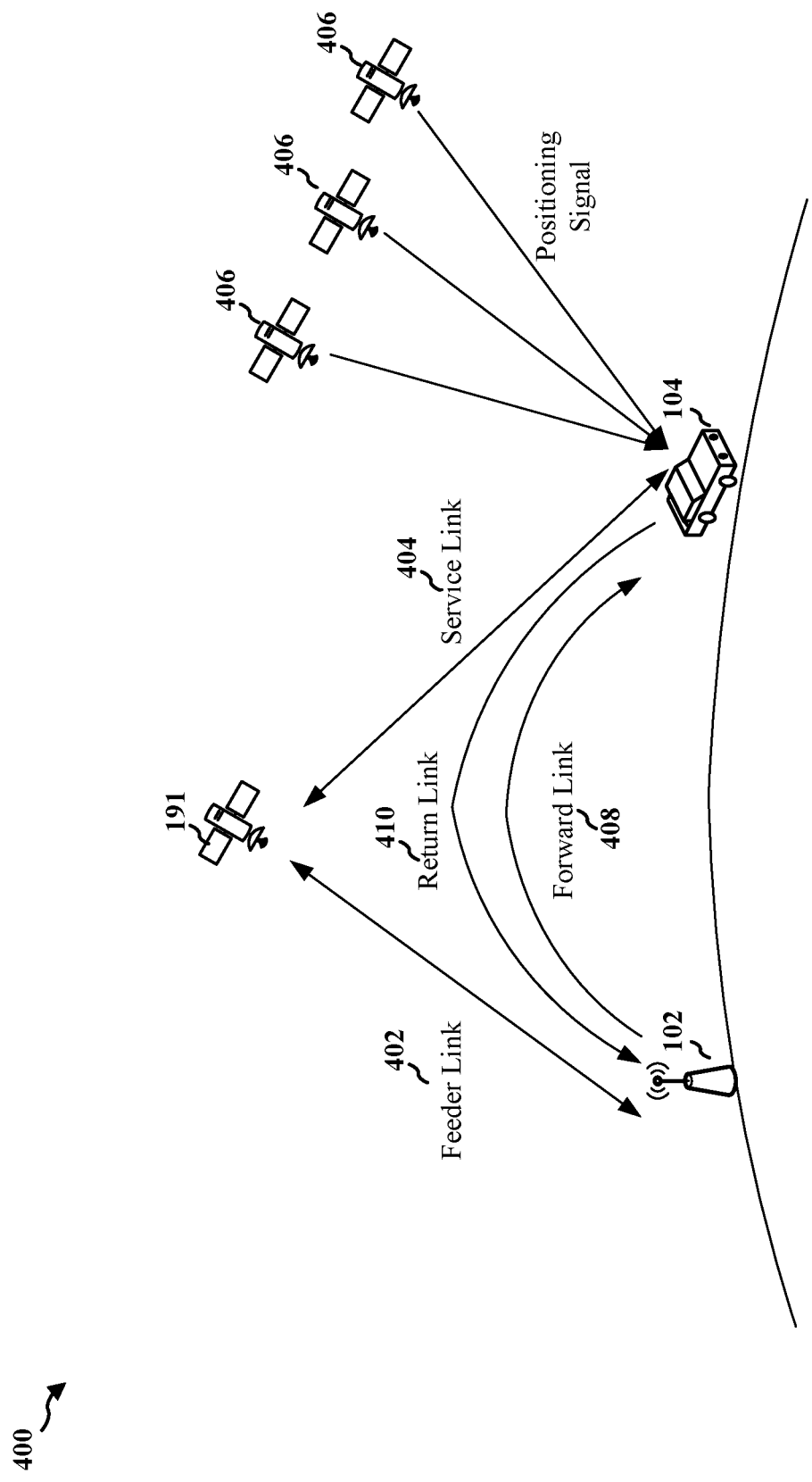
FIG. 4 is a diagram illustrating an example of a non-terrestrial network (NTN) including a narrowband Internet of Things (NB-IoT) deployment.

FIG. 4 illustrates an example of an NTN 400 in a NB-IoT deployment. The NTN 400 may correspond to the wireless communications system and access network 100 of FIG. 1 including satellite 191. For example, the NTN 400 may include NTN cell 188 in which UE 104 and base station 102 communicate via satellite 191. While this example specifically refers to NTN in an NB-IoT system, the following concepts may similarly apply to NTNs in other MTC deployments such as enhanced machine type communications (eMTC), NTNs including geosynchronous or geostationary orbit (GSO) satellites, LTE deployments, NR deployments, or other deployments or radio access technologies. For example, the concepts and various aspects described herein may be applicable to areas such as NB-IoT, eMTC, NR, LTE, LTE-Advanced (LTE-A), Code Division Multiple Access (CDMA), Global System for Mobile communications (GSM), or other deployments or wireless/radio access technologies.

In this example, satellite 191 allows cellular service from base station 102 to be provided to UE 104 via a plurality of links in a bent pipe structure. These links may include a feeder link 402 between the base station 102/180 and the satellite 191, and a service link 404 between the satellite 191 and the UE 104. The satellite 191 may be, for example, a repeater station in GEO, which may be located at a height such as approximately 36000 kilometers from the surface of the ground. In other examples, the satellite 191 may be a MEO satellite or a LEO satellite. The UE 104 may estimate and compensate for link delays and Doppler effects over the feeder link 402. For instance, a UE with global navigation satellite system (GNSS) capability may receive a system information block (SIB) advertising the location of the satellite 191, acquire a GNSS signal via one or more satellites 406 indicating a current position of the UE, and use this position information to update the UE's time and frequency offset and thus obtain an accurate timing advance relative to the timing of the base station 102. The UE 104 may continue to update its timing advance in like manner as the UE 104 moves relative to the base station 102 or satellite 191. Moreover, the feeder link 402 between the base station 102 and satellite 191 may provide greater link budget than that which may otherwise be achieved between the base station and UE in a TN. For instance, the satellite 191 may have larger aperture antennas than those of the base station 102 and thus may provide greater receiver (Rx) gain at the UE 104, as well as a larger effective isotropic radiated power (EIRP) in its transmissions to the UE than that of the base station. The UE 104 may also operate under a signal to noise ratio (SNR) comparable to that which the UE may otherwise experience in NB-IoT TN deployments. Additionally, the service link 404 may be transparent to the UE 104. That is, from the UE's perspective, downlink transmissions may be received over a forward link 408 from the base station 102 while uplink transmissions may be sent over a return link 410 to the base station. As a result, the NTN 400 may provide improved coverage to UEs over a larger area compared to TN deployments lacking such satellites 191, 406.

Figure 5:
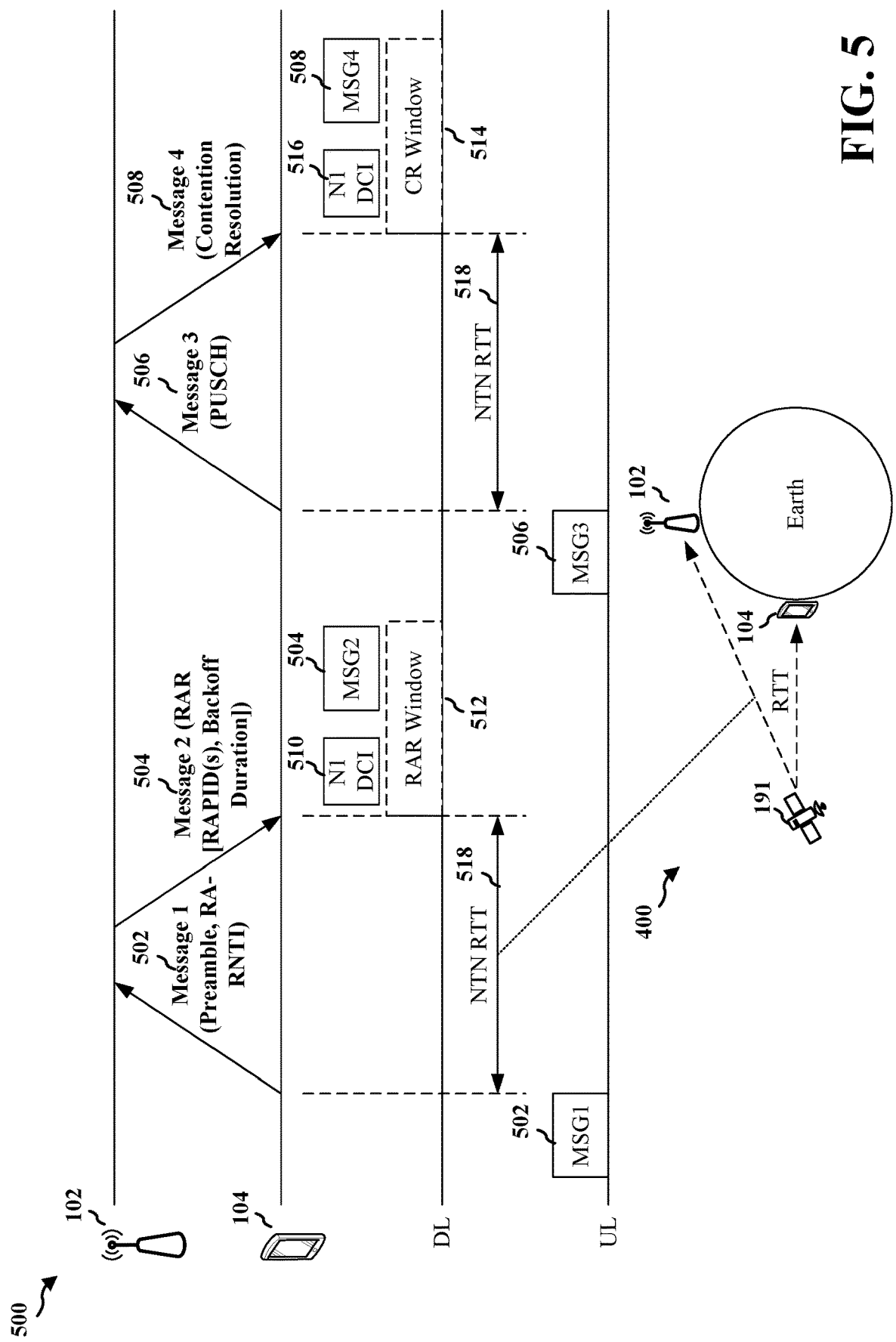
FIG. 5 is a diagram illustrating an example of a random access channel (RACH) procedure in an NTN.

FIG. 5 illustrates an example 500 of a random access channel (RACH) procedure which UE 104 may perform in an NTN, such as NTN 400. In a four-step contention-based RACH procedure, four messages may be provided between UE 104 and base station 102. For example, during an initial attach procedure and while the UE 104 is in an idle mode (an RRC idle state), UE 104 may send a preamble 502 to the base station 102 in a message 1 (msg1), UE 104 may receive a random access response (RAR 504) from the base station 102 in a message 2 (msg2), UE 104 may send an RRC Connection Request message or other payload (uplink transmission 506) to the base station 102 in a message 3 (msg3), and UE 104 may receive an RRC Connection Setup message or other transmission subject to contention resolution (a contention resolution message 508) from the base station in a message 4 (msg4).

In one example, the UE 104 initially selects the preamble 502 from a set of generated preambles and transmits the preamble 502 to the base station 102 with an associated random access radio network temporary identifier (RA-RNTI) of the UE 104 in message 1. The UE 104 may transmit the preamble 502 to the base station 102 in a PRACH or NPRACH at a configured PRACH or NPRACH occasion, and the UE 104 may compute RA-RNTI based on a timing of the PRACH or NPRACH occasion. If transmitting the preamble 502 in NPRACH for NB-IoT, the UE may repeat transmission of the preamble 502 a configured number of times associated with its coverage enhancement level (e.g., 0, 1, or 2) during a single RACH attempt.

In response to receiving the preamble, the base station 102 decodes the message to identify the preamble 502 transmitted by the UE, and configures RAR 504 including a random access preamble identifier (RAPID) associated with the decoded preamble. If the base station 102 receives other preambles from other UEs at or around the same time as the preamble 502 from the UE 104, the base station 102 may configure the RAR with multiple RAPIDs respectively associated with these other preambles for the other UEs. The base station 102 may then transmit to the UE(s) a DCI 510 indicating the time and frequency resources of the RAR 504, as well as the RAR 504 itself including the RAPID(s) in message 2. The DCI 510 may include a cyclic redundancy check (CRC) that is scrambled or masked with the RA-RNTI value associated with the preamble(s) of the UE(s). The DCI 510 may also include a temporary cell RNTI (T-CRNTI) for the UE 104 and schedule uplink resources to the UE 104 for the message 3 transmission. In NB-IoT, the DCI 510 may include an N1 DCI format such as illustrated in the example of FIG. 5.

The UE 104 then monitors a RAR window 512 for the DCI 510 indicating the resources of the RAR 504. The timing of RAR window 512 may be configured in a system information block (SIB) such as SIB2. When monitoring the RAR window 512, the UE 104 may perform blind decoding of PDCCH or NPDCCH candidates that potentially include the DCI 510. For example, the UE 104 may perform blind decoding by receiving PDCCH or NPDCCH candidates at one aggregation level (e.g., 1), attempting to demask a CRC using the RA-RNTI, comparing the potentially demasked CRC to an expected CRC, and if a CRC error is detected or the UE cannot decode the PDCCH or NPDCCH candidates at one aggregation level, the UE repeats the process at higher aggregation levels (e.g., 2, 4, 8, etc.) until no CRC error is detected and decoding is successful. If blind decoding is unsuccessful and no DCI is consequently found, the RACH attempt may fail, and so the UE 104 may repeat the aforementioned RACH process in a subsequent RACH attempt beginning at the next consecutive RACH preamble occasion for message 1 using a higher transmission power for its preamble. The UE 104 may continue to perform RACH attempts until a maximum number of RACH attempts has been reached.

On the other hand, if blind decoding is successful, the UE 104 may identify DCI 510 in the PDCCH or NPDCCH and may subsequently decode the RAR 504 in the PDSCH or NPDSCH from the base station 102. After decoding the RAR 504, the UE 104 may determine if one or more of the RAPID(s) in the RAR 504 matches the RAPID assigned to the UE 104. If no matching RAPID is determined, the RACH attempt may fail, and so the UE 104 may repeat the aforementioned RACH process in a subsequent RACH attempt beginning at message 1. In particular, the UE 104 may send its message 1 after waiting a backoff duration indicated in the RAR 504 and using a higher transmission power for its preamble. If on the other hand a RAPID match is determined in the RAR 504, the UE 104 may then transmit message 3, such as an RRC connection request, in PUSCH or NPUSCH to the base station 102 in the scheduled time and frequency resources in the RAR 504. The message 3 may include a CRC that is scrambled or masked with the TC-RNTI associated with the UE 104 in the RAR 504. If other UEs that monitor and decode the RAR 504 also determine a matching RAPID exists, these UEs may similarly transmit message 3 in time and frequency resources to the base station 102. If any of these other UEs sent the same preamble to the base station in message 1 as the UE 104 and thus determine a same matching RAPID in message 2, these UEs may send message 3 in overlapping time and frequency resources and result in a collision or conflict. This conflict may be resolved subsequently during contention resolution.

During contention resolution, if the base station 102 receives the message 3 successfully from the UE 104, the base station 102 transmits the message 4 to the UE 104. For instance, the base station 102 may transmit an RRC connection setup message to the UE 104. The message 4 may include a cell RNTI (C-RNTI) associated with the UE 104, and a CRC that is scrambled with the TC-RNTI associated with the UE. The UE 104 may monitor for this message 4 in a contention resolution window 514 governed by a contention resolution timer in a similar manner to message 2. For instance, the UE 104 may perform blind decoding in a common search space for a DCI 516 including time and frequency resources for message 4, but this time using the TC-RNTI associated with the UE (rather than the RA-RNTI). If the DCI 516 is successfully decoded, the UE 104 may receive message 4, set its C-RNTI to the TC-RNTI, and transition to a connected mode (an RRC connected state) since the RACH procedure is successfully completed. In NB-IoT, similar to DCI 510, the DCI 516 may also include an N1 DCI format such as illustrated in the example of FIG. 5.

On the other hand, if the base station 102 had received multiple message 3 instances from different UEs in overlapping time and frequency resources due to them having selected a same preamble, the base station 102 may fail to decode one or more of these messages and not send message 4 to the respective UEs. In case of such contention, collision, or conflict, the UE 104 may fail to receive the message 4 and consequently fail the RACH attempt, and so the UE may perform another RACH attempt repeating the aforementioned process beginning again at message 1. The UE 104 may increase its transmission power of its message 1 and message 3 in respective RACH attempts until either the RACH procedure is successful (message 4 is successfully received), or until a maximum number of failed RACH attempts has been reached.

Also in NB-IoT, if the UE 104 fails to decode a message 2 or receive a message 4 from the base station, the RACH attempt may fail, and the UE 104 may repeat the aforementioned RACH process in subsequent RACH attempts up to a maximum number of attempts in its associated coverage enhancement level. If the RACH process still fails at this point, the UE 104 may re-attempt the RACH procedure in another coverage enhancement level, and continue in a like manner until either a RACH attempt succeeds or a maximum number of RACH attempts has failed across one or more coverage enhancement levels. The UE 104 may ramp its transmission power higher during each subsequent RACH attempt and coverage enhancement level.

Once the UE 104 succeeds in its RACH procedure, the UE 104 may transition to the connected mode and proceed to communicate with the base station 102 on a periodic, semi-persistent, or aperiodic basis. Later on, if after some period of time while the UE 104 is in connected mode the UE has data available in its buffer for transmission but does not currently have an uplink grant available, the UE may trigger and send a scheduling request (SR). For example, the UE 104 may trigger a SR in response to triggering of a buffer status report (BSR) when data becomes available for uplink transmission. In response to the SR, the base station 102 may provide an uplink grant to the UE. On the other hand, if the UE determines that a particular scenario prevents or preempts triggering of the SR, for example, if PUCCH resources for SR are not configured, if the SR occasion is within a measurement gap period, if a SR prohibit timer is running, if a maximum number of SR transmissions has been performed, or some other condition preventing SR transmission is met, the UE 104 may instead initiate a contention-based RACH procedure (while in the connected mode) including transmission of message 1, reception of message 2, transmission of message 3, and reception of message 4, to eventually obtain the uplink grant. In the case of NB-IoT, when the UE 104 is in the connected mode in NB-IoT and has uplink data available for transmission triggering an SR, the UE 104 may request scheduling of uplink resources via the RACH procedure, rather than via dedicated radio resources for uplink transmission as in LTE or NR. For instance, the UE 104 may transmit a RACH preamble in NPRACH including a bit or some other information indicating a SR.

In an NTN such as NTN 400 where the base station 102 provides cellular coverage to UE 104 via satellite 191, a round trip time (RTT 518) between the UE 104 and base station 102 may be significant. For example, in cases where the satellite 191 is a GSO satellite located between 35,786 km and 41,680 km from the UE 104 depending on UE position, the RTT 518 may be on the order of 500 ms. As a result, when the UE performs a 4-step RACH procedure such as previously described, the RTTs 518 of respective communications between the UE and base station in the NTN 400 may be much larger than those in a TN. For instance, a single RACH process or attempt including a message 1, message 2, message 3, and message 4 transmission in an NTN may have double the total RTT of that of a RACH process in a TN, amounting to approximately an additional 1 second delay in NTNs compared to TNs. For example, in the illustrated example of FIG. 5, an additional RTT on the order of 500 ms may occur in NTNs compared to a given RTT in TNs between transmission of message 1 and reception of message 2, and similarly, an additional RTT on the order of 500 ms may occur in NTNs compared to a given RTT in TNs between transmission of message 3 and reception of message 4. Moreover, since the UE 104 may experience greater path loss due to larger distances between transmitters and receivers in NTNs compared to TNs, the UE 104 may use significantly more transmission power in its RACH attempts in NTNs to compensate for this greater path loss than in TNs. As a result, greater time delay and transmission power penalties may result from a failed RACH attempt in an NTN than in a TN.

However, NTNs 400 may include much larger coverage areas for its cells than in TNs due to the inclusion of satellite(s) 191, 406, such as in an order of 100-300 km in NTN cell coverage compared to an order of 2-3 km in TN cell coverage, and thus significantly more UEs 104 may contend for resources of base stations 102 via RACH processes in NTN cells 188 compared to TN cells 189. This increased cell coverage of NTN cells 188 may in turn result in greater probability of a PRACH collision occurring between different UEs 104. For instance, there is a higher likelihood in NTNs 400 than in TNs of multiple UEs selecting a same preamble 502 for message 1 with a same RAPID, and thus the base station 102 including this same RAPID in a RAR 504 for multiple UEs and triggering the UEs to send message 3 in overlapping resources, which prevent the base station from receiving and acknowledging the UEs' messages in message 4. Since this high collision probability associated with NTNs 400 may result in a larger number of unsuccessful RACH attempts per connection request than that which the UE 104 may experience in a TN, such failed RACH attempts may result in a significant waste of resource allocations, delays in connecting to the network, and transmission power consumption in NTNs compared to TNs.

Additionally, in NB-IoT deployments where resources are more limited than in other deployments such as LTE or NR, this likelihood of PRACH collisions may be even higher than in other deployments. For example, in NB-IoT, a lesser, maximum quantity such as 48 RAPIDs may be configurable for a carrier in contrast to other deployments such as NR, where a greater, maximum quantity such as 64 RAPIDs is allowed to be configured. This smaller quantity of available RAPIDs in NB-IoT may in turn result in a higher probability of PRACH collision than in other deployments with larger quantities of available RAPIDs. Furthermore, this high collision probability may in turn be multiplied by the number of different coverage enhancement levels corresponding to different path loss classifications configurable in NB-IoT, since the UE 104 may re-attempt its RACH process numerous times across different coverage enhancement levels with similar likelihood of failure. Such repeated RACH failures may result in even larger delay penalties and transmission power penalties for NB-IoT NTN deployments than for other types of NTN deployments. For instance, if a UE in coverage enhancement level 0 fails its maximum number of RACH attempts due to PRACH collisions, repeats and again fails its RACH attempts in coverage enhancement level 1 also due to PRACH collisions, and finally repeats and again fails its RACH attempts in coverage enhancement level 2 again due to PRACH collisions, the effective delay penalty and transmission power penalty may be tripled compared to wider bandwidth LTE or NR deployments. As a result, to minimize the non-negligible rate of RACH failures that may occur in NTNs, it would be helpful to optimize the RACH procedure so that fewer RACH attempts per UE connection request may be applied. This optimization may be especially helpful in, but is not limited to, NTN NB-IoT deployments.

Figure 6:
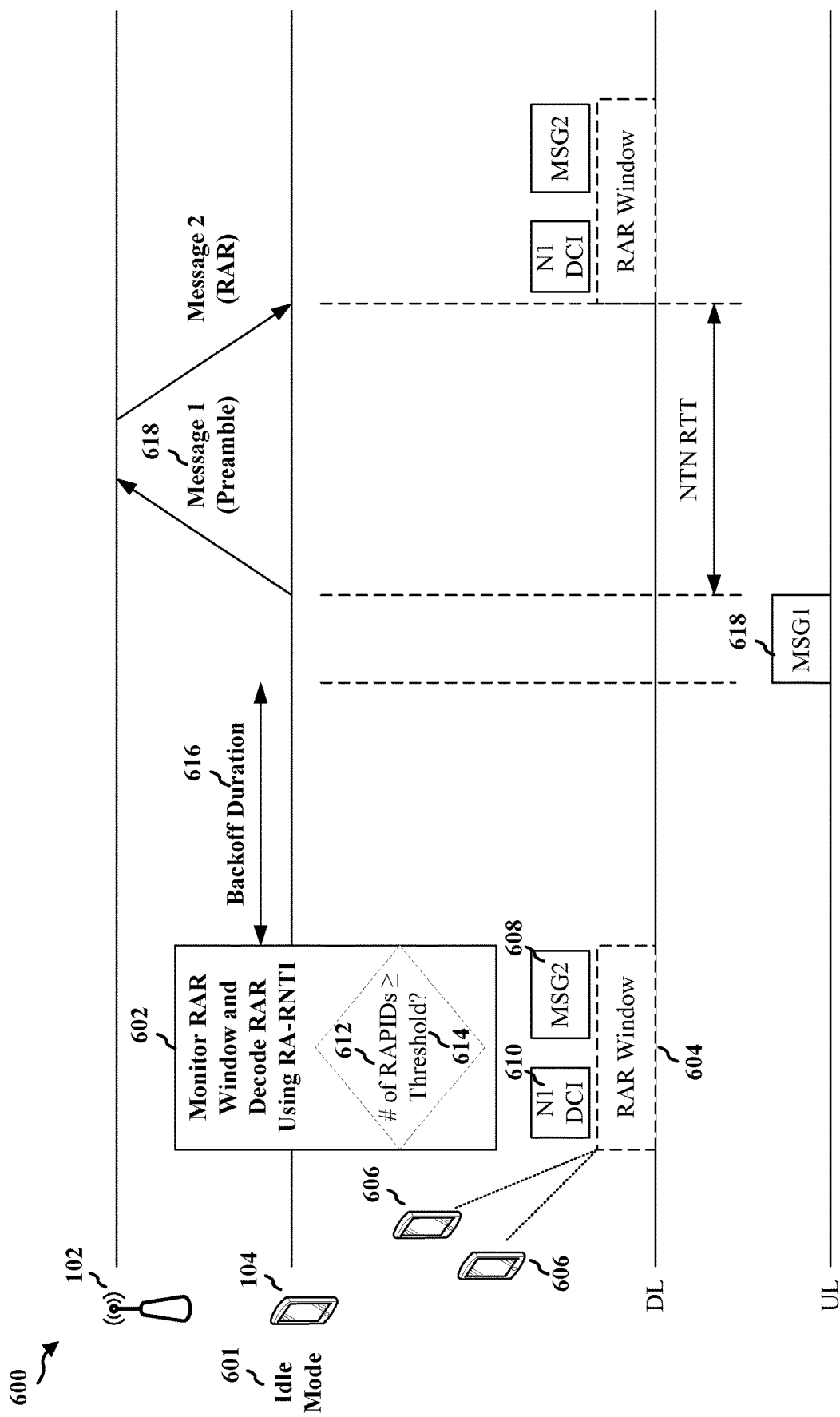
FIG. 6 is a diagram illustrating one example of an optimized RACH procedure in an NTN deployment.

FIG. 6 illustrates one example 600 of an optimized RACH procedure in an NTN deployment. In this example, the UE 104 may perform RAR sniffing to detect a current load of the network at a given point of time. In particular, the UE 104 may consider the number of RAPIDs in a single RAR as an indicator of the current RACH load on the network. Depending on the network load, the UE 104 may either send message 1 in a RACH procedure or apply a backoff to delay sending message 1 to reduce the likelihood of collisions. The backoff may be randomized in one example, while in other examples, the backoff, or a range of values in which a backoff may be configured or randomly selected, may be indicated outside of the RAR such as in a SIB2 or other configuration. Thus, the likelihood of the network including RACH failures may decrease. While this approach may result in delays for RACH connection attempts, IoT devices are generally delay-tolerant, and in any case, such delays are overshadowed by the significant reduction in UE power consumption that may be achieved from higher RACH success rates. For instance, monitoring the RAR prior to sending message 1 may allow the UE 104 to anticipate current network congestion without inefficiently consuming and ramping power to a maximum level in its uplink transmissions.

In this example, when UE 104 is in an idle mode 601 and before the UE sends message 1 in a given RACH attempt, at block 602, the UE 104 may monitor a RAR window 604 for message 3 grants to one or more other UEs 606. When monitoring the RAR window for a RAR 608 at block 602, the UE may perform blind decoding for a DCI 610 in a common search space using its RA-RNTI to demask the CRC associated with the DCI 610, such as previously described with respect to FIG. 5. Here, the RA-RNTI associated with the RAR 608 may be a common RA-RNTI for multiple UEs 606 who previously sent message 1 and are thus expecting a matching RAPID in message 2. Thus, the UE 104 may obtain this common RA-RNTI for decoding the RAR 608 even though the UE 104 is not sending a message 1 at this time; for example, the UE 104 may compute the RA-RNTI based on the timing information of other UEs' preamble transmissions. The DCI 610 indicating the RAR resources may be received in a PDCCH in a LTE or NR deployment, a NPDCCH in an NB-IoT deployment, or in some other deployment in a NTN.

If the UE 104 successfully decodes the RAR at block 602 in response to the blind decoding using the common RA-RNTI, the UE 104 may determine that the RAR 608 includes multiple RAPIDs 612 associated with the other UEs. If the amount of RAPIDs 612 indicated in the RAR 608 meets or exceeds a threshold quantity 614 of RAPIDs, the UE 104 may determine that the current load applied to the network at a given time or location is high, and thus that there is low likelihood the UE 104 will succeed in a RACH attempt at this given time or location due to a high collision probability. As a result, the UE 104 may apply a backoff to delay initiation of the RACH procedure until a subsequent PRACH or NPRACH occasion. For instance, the UE may refrain from transmitting message 1 for a backoff duration 616. After the backoff duration 616 has passed, the UE 104 may then send a preamble 618 in message 1, since by this time the other UEs 606 may have already completed their RACH procedures and the chances of collision may be less. On the other hand, if the amount of RAPIDs 612 indicated in the RAR 608 does not meet or exceed this threshold quantity, the UE 104 may determine the current network load is moderate or low and thus the chances of a successful RACH attempt may be moderate or high, and thus the UE 104 may proceed to initiate the RACH procedure without applying the backoff. In either case, after sending the preamble 618, the RACH procedure may then continue as previously described with respect to FIG. 5.

The threshold quantity 614 of RAPIDs may be based on the network deployment. For instance, in an NB-IoT deployment where the base station 102 is constrained to communicate with the UE 104 within a single resource block due to a system bandwidth of 180 kHz, the threshold quantity 614 may be relatively low, since the base station 102 does not have sufficient resources to sustain a large number of UE connections. However, in wider bandwidth LTE or NR deployments with larger numbers of RBs or resources with which the base station 102 may communicate with the UE 104, this threshold quantity 614 may be higher since the base station 102 may sustain more UE connections in these deployments. For instance, in NB-IoT, the threshold quantity 614 may be, for example, 25% of the total configurable number of available RAPIDs, such as a threshold quantity of 12 out of a maximum quantity of 48 RAPIDs, while in eMTC, LTE, or NR, the threshold quantity 614 may be greater than 25%. Thus, the threshold quantity 614 may be a function of network configuration.

Moreover, the backoff duration 616 which the UE 104 applies to delay its message 1 transmission may be independent of a backoff indicator included in the RAR 608. A RAR backoff indicator is generally specific to a UE 606 that previously sent a preamble and which RAPID is indicated in the RAR 608, so the UE 104 monitoring the RAR 608 may not particularly benefit from utilizing this backoff to delay message 1. Instead, the UE 104 may be separately configured with the backoff duration 616 for this purpose, for example, in a RACH configuration including a backoff duration field, or the UE 104 may apply a randomized backoff duration to delay initiation of the RACH procedure. In either case, a range of backoff durations from which this backoff duration 616 may be selected, either for backoffs indicated in a configuration or randomly determined backoffs, may depend on a delay-tolerance level of the UE, an application of the UE, or some other factor.

Figure 7:
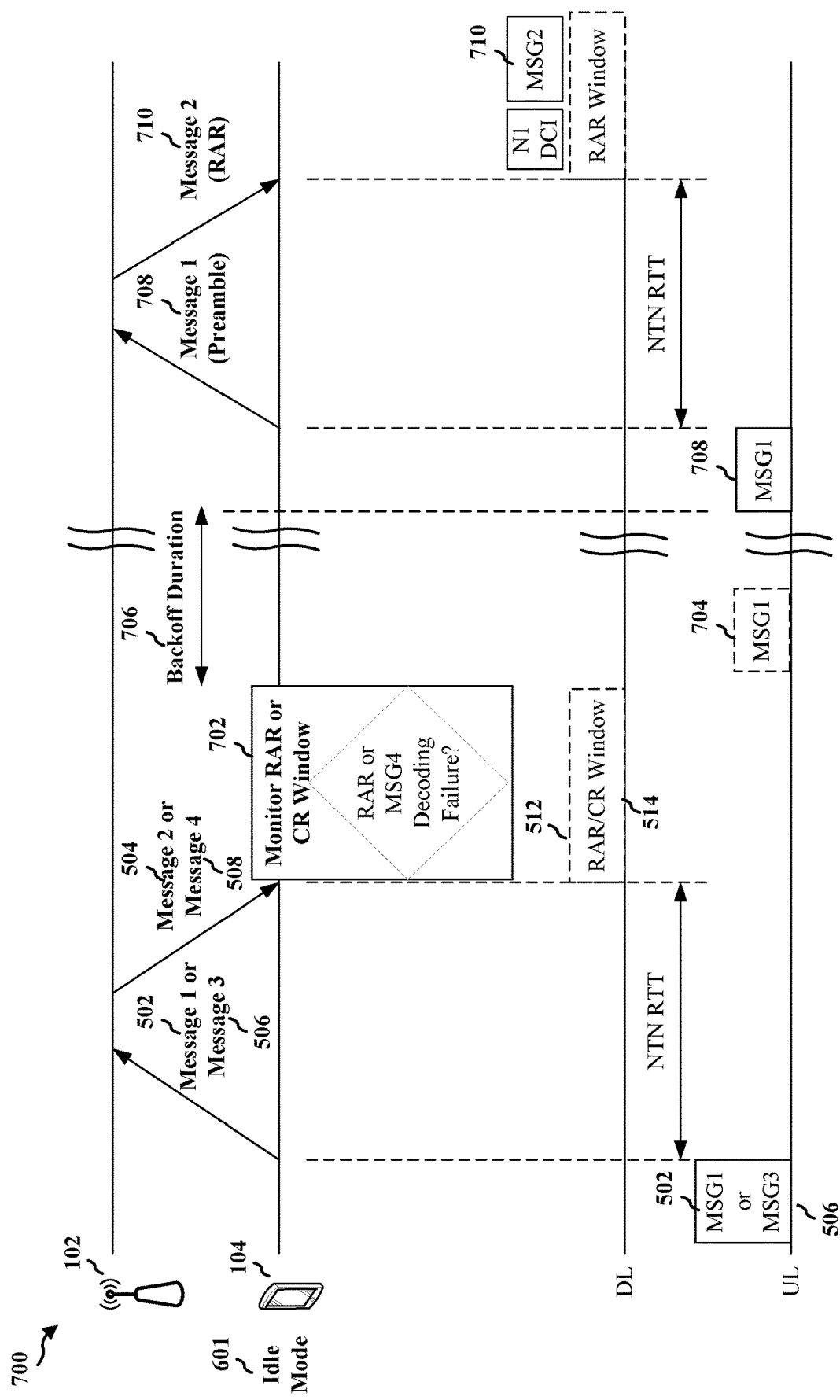
FIG. 7 is a diagram illustrating another example of an optimized RACH procedure in an NTN deployment.

FIG. 7 illustrates another example 700 of an optimized RACH procedure in an NTN deployment. In particular, if the UE 104 fails a RACH attempt after transmitting a preamble in one PRACH occasion, for example, due to a deep fade or network congestion, then the UE 104 may apply a backoff before performing the subsequent RACH attempt. For instance, rather than immediately transmitting another preamble in a next PRACH occasion during a subsequent RACH attempt when the deep fade, network congestion, or other cause of the RACH failure may still persist, here the UE 104 may refrain from sending message 1 in a subsequent RACH attempt until after a randomized backoff duration has passed. The backoff may be randomized as in this example, while in other examples, the backoff, or a range of values in which a backoff may be configured or randomly selected, may be indicated outside of a RAR such as in a SIB2 or other configuration. By incurring this additional delay between consecutive RACH attempts (on top of the delay between consecutive PRACH occasions), the UE 104 may minimize the likelihood of the deep fade, persistent network congestion, or similar scenarios from continuing to affect subsequent RACH attempts, thereby reducing the probability of continuing RACH failures.

In this example, when the UE 104 is in the idle mode 601, the UE 104 may initially send preamble 502 in message 1 in a given RACH attempt. The UE may then, at block 702, monitor the RAR window 512 for RAR 504 in response to the message 1, for example using blind decoding as described with respect to FIG. 5. However, in certain cases, the UE 104 may not be able to successfully decode the RAR 504, or even if the UE 104 does decode the RAR, the UE may not be able to successfully receive message 4. For instance, if the UE 104 is a low mobility device, then deep fading due to obstacles, signal interference, or other factors may cause the message 2 to experience significant path loss or the UE 104 to experience significant reduction in channel SNRs. As a result, the UE 104 may fail during blind decoding at block 702 to detect the DCI 510 indicating the resources for the RAR 504, or the UE 104 may fail to decode the RAR 504 in the PDSCH or NPDSCH even if the DCI 510 is successfully decoded. Alternatively, even if the UE 104 does successfully decode the RAR 504 and subsequently sends uplink transmission 506 via message 3 in a congested network, the UE 104 may still not receive contention resolution message 508 via message 4, for example, if the base station fails to decode the UE's message 3 due to conflicts with other UEs. Thus in either case, the UE 104 may fail its RACH attempt.

Generally, when the UE 104 fails a RACH attempt, the UE 104 re-attempts the RACH procedure by transmitting message 1 in a next consecutive PRACH or NPRACH transmission occasion 704. For instance, in the case where the UE 104 fails to decode RAR 504 in the RAR window 512, the UE 104 is unable to obtain the backoff indicator in the RAR 504 to apply for its subsequent PRACH or NPRACH transmission, and therefore the UE 104 instead sends another preamble in subsequent, transmission occasion 704 for the next RACH attempt. Similarly, in the case where the UE 104 fails to receive contention resolution message 508 from the base station 102, the UE 104 transmit another preamble in the subsequent, transmission occasion 704. However, if the RACH failure was due to a persistent cause such as deep fade or network congestion, there is a high likelihood that the next RACH attempt in the consecutive RACH occasion will be similarly affected, and thus RACH failures associated with consecutive message 1 occasions may accordingly result. Since the UE 10 may continue to ramp its transmission power higher and higher with respective subsequent RACH attempts, the amount of transmission power the UE 104 consumes overall may be significant.

Therefore, in this example, rather than merely incurring a short delay and sending another preamble in the consecutive, subsequent transmission occasion 704, the UE 104 applies a backoff to incur an extra delay between consecutive PRACH or NPRACH transmissions in attempt to wait out the deep fade, network congestion, or similar scenario. For instance, after expiration of the RAR window 512 including RAR 504 which the UE failed to decode, or after expiration of a contention resolution timer or window 514 for contention resolution message 508 which the UE 104 failed to receive, the UE 104 may wait an additional, randomized, backoff duration 706. After the backoff duration 706 has expired, the UE 104 may proceed to initiate the subsequent RACH attempt by sending a preamble 708 in a next PRACH or NPRACH occasion. If the deep fade, network congestion, or similar scenario has passed during the backoff duration 706, the UE may successfully decode a RAR 710 in a subsequent RAR window, while if such scenario still persists and the RACH attempt fails again, the UE 104 may apply another randomized backoff and repeat the aforementioned process until a subsequent RACH attempt eventually succeeds. While this approach may result in larger latencies for RACH connection attempts of a given UE, the higher success probability resulting from waiting out the persistent failure cause may overall result in the UE more rapidly achieving a successful RACH connection request. Moreover, if multiple UEs apply this approach with different randomized backoffs, the network congestion or similar persistent failure cause may be ameliorated more quickly, further improving RACH success rates overall in the network.

Figure 8:
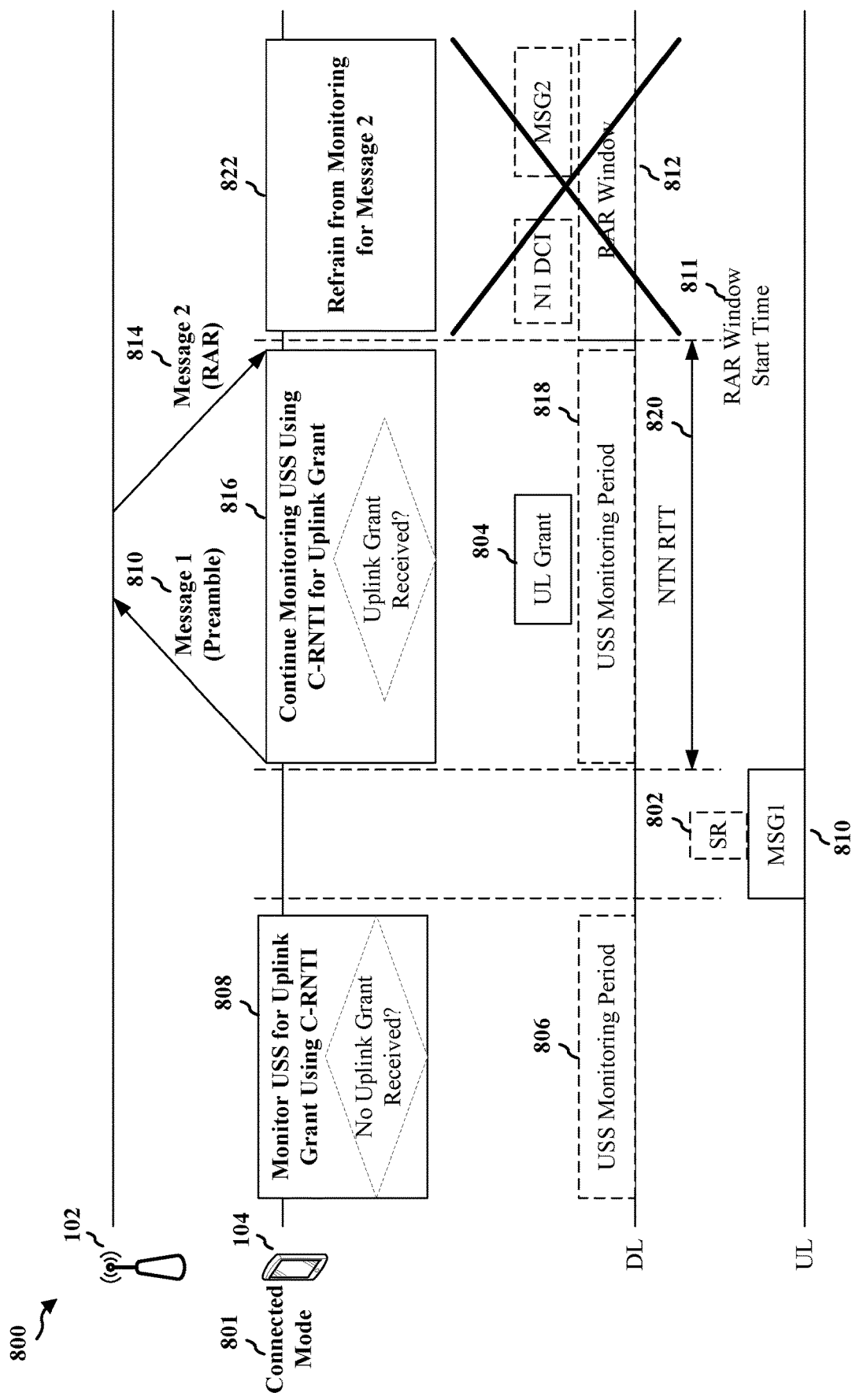
FIG. 8 is a diagram illustrating a further example of an optimized RACH procedure in an NTN deployment.

FIG. 8 illustrates a further example 800 of an optimized RACH procedure in an NTN deployment. Unlike the prior two examples of FIGS. 6 and 7 where the UE 104 is in an idle mode 601 and performs an initial RACH attempt to connect to the network, this example applies to the situation where the UE 104 is already in a connected mode 801 following a prior RACH attempt and is initiating another RACH procedure for an SR 802 in NB-IoT since the UE has data available in its buffer to transmit. Occasionally, when the base station 102 sends a dynamic uplink grant to the UE 104, the uplink grant may not be received due to delay factors until after the UE 104 has already sent message 1 in a RACH attempt. While the possibility of such delayed uplink grant is generally ignored in TNs after transmission of message 1, the additional RTT incurred in NTNs 400 may result in increased probability that a delayed uplink grant will be received before message 2 is transmitted. Therefore, to leverage this characteristic of NTNs towards an optimized RACH process, the UE 104 may monitor a user-specific search space (USS) for a possible delayed uplink grant between the time the UE 104 transmitted message 1 and before the beginning of a RAR window for monitoring message 2. If the UE 104 receives an uplink grant in the USS during this time, the UE 104 may abort the RACH procedure since the SR 802 is no longer necessary. As a result, the UE 104 may communicate with the base station 102 without first having to succeed in one of possibly multiple RACH attempts, minimizing delays in uplink transmission and transmission power consumption in RACH procedures.

In this example, when the UE 104 is in the connected mode 801, the UE may initially monitor a USS for an uplink grant 804 during a period of time 806 at block 808. For example, when monitoring the USS for a DCI during monitoring period of time 806, the UE 104 may perform blind decoding for a DCI in the USS using a C-RNTI to demask the CRC associated with the DCI, in a same manner as that previously described with respect to RAR blind decoding in FIG. 5. If the UE 104 fails to receive uplink grant 804 from the base station 102 in the USS and an SR has been triggered, the UE may initiate a RACH procedure to send the SR 802 by transmitting a preamble 810 in message 1. For example, in NB-IoT, the UE 104 may transmit a preamble in NPRACH in a NPRACH transmission occasion including a bit or other indicator of SR 802.

Generally, the base station 102 may not be informed in advance of a triggered SR without an indication of such SR 802 from the UE 104, and the UE 104 may not be able to predict the timing of uplink grants 804 in an aperiodic scheduling pattern of the base station 102. Due to this lack of synchronicity between the base station 102 and the UE 104 with respect to data availability and grants, there is a possibility even in TNs that the base station 102 may transmit an uplink grant, or that the UE may receive an uplink grant, after the UE 104 has transmitted message 1. However, in NTNs, the likelihood of this possibility occurring is significantly greater, since the additional RTT between transmission of message 1 and reception of message 2 in a RAR window for an NTN 400 may be on the order of hundreds of milliseconds larger than the RTT for a TN.

Therefore, in this example, after transmitting the preamble 810, and rather than waiting until a start time 811 of a RAR window 812 to monitor for a RAR 814 in message 2, the UE 104 at block 816 may continue monitoring the USS for uplink grant 804 during a period of time 818 prior to the start time 811 of the RAR window 812. This period of time 818 may correspond to an entirety of, or at least a portion of, an RTT 820 expected between transmission of preamble 810 in message 1 and reception of RAR 814 in message 2. For instance, the UE 104 may continue after block 808 to again perform blind decoding at block 816 for a DCI in the USS, again using the C-RNTI to demask the CRC associated with the DCI, during the period of time 818 corresponding to RTT 820. If the UE 104 still fails to receive the uplink grant 804 during the continued monitoring window or period of time 818, for example as a result of the base station 102 not transmitting the uplink grant 804 during this time period, the UE 104 may continue the RACH process beginning with monitoring of the common search space for message 2 in the RAR window 812. However, if UE 104 does receive the uplink grant 804 in the USS during the continued monitoring window or period of time 818, for example, in response to successfully decoding at block 816 the DCI in the USS including scheduled uplink resources, the UE 104 may cancel the RACH procedure (and thus the SR 802) to avoid further delays in sending its uplink data to the base station 102. For example, at block 822, the UE 104 may refrain from monitoring for the RAR 814 in the RAR window 812 and instead proceed to transmit uplink data in the resources indicated by the uplink grant 804.

Figure 9:
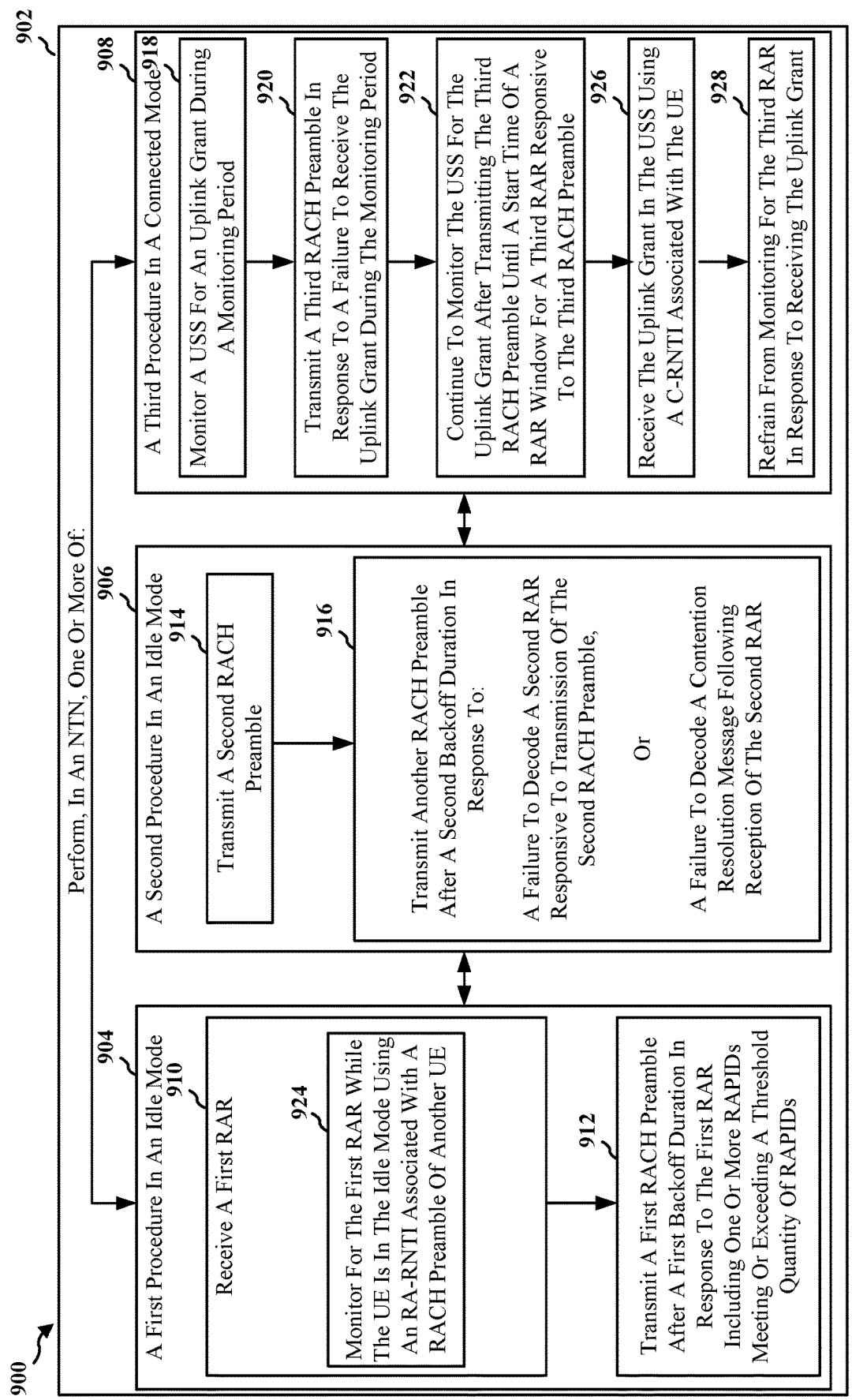
FIG. 9 is a flowchart of a method for wireless communication performable at a UE.

FIG. 9 is a flowchart 900 of an example method or process for wireless communication performable at a UE which performs optimized RACH procedures in NTN deployments, such as in NTN NB-IoT deployments. The method may be performed by a UE, such as the UE 104, 350, the apparatus 1002, or its components as described herein.

In some examples, in block 902, the UE performs, in a NTN, one or more of: a first procedure 904 in an idle mode, a second procedure 906 in the idle mode, or a third procedure 908 in a connected mode. For example, block 902 may be performed by NTN procedure component 1040. In some examples, the second procedure is performed before or after the first procedure. In some examples, the third procedure is performed before or after the first procedure, before or after the second procedure, before the first procedure and the second procedure, or after the first procedure and the second procedure. Thus, the different procedures may be performed individually or in combination in different possible orders. For instance, referring to the Figures, UE 104 or NTN procedure component 1040 may perform various operations in NTN 400, such as in NTN cell 188, according to any of the examples of FIG. 6 (the first procedure), FIG. 7 (the second procedure), and FIG. 8 (the third procedure). For example, the UE 104 or NTN procedure component 1040 may perform the operations described with respect to FIG. 7 before or after the operations described with respect to FIG. 6, or the operations described with respect to FIG. 8 before or after the operations described with FIGS. 6 and 7 alone or in combination. Thus, the various aspects described with respect to FIGS. 6, 7, and 8 may be performed independently or in combination with one another depending on the mode of the UE. For instance, the UE 104 or NTN procedure component 1040 may perform the first procedure of FIG. 6 followed by the second procedure of FIG. 7, or vice-versa, while in idle mode 601, after which when the UE transitions to connected mode 801, the UE 104 or NTN procedure component 1040 may perform the third procedure of FIG. 8. Alternatively or additionally, after performing the third procedure of FIG. 8, if the UE 104 or NTN procedure component 1040 later transitions from connected mode 801 to idle mode 601, then the UE 104 or NTN procedure component 1040 may afterwards perform one or more of the first procedure of FIG. 6 followed by the second procedure of FIG. 7, or vice-versa.

In some examples of block 902, when the UE performs the first procedure 904 in the idle mode, the UE receives a first RAR in block 910, and in block 912, the UE transmits a first RACH preamble after a first backoff duration in response to the first RAR including one or more RAPIDs meeting or exceeding a threshold quantity of RAPIDs. For instance, referring to the Figures, UE 104 or NTN procedure component 1040 may receive RAR 608 while the UE is in idle mode 601, and in response to determining that RAR 608 includes a number of RAPIDs 612 that is greater than or equal to the threshold quantity 614 of RAPIDs, the UE 104 or NTN procedure component 1040 may transmit preamble 618 after waiting for backoff duration 616 to pass. In some examples, when the UE receives the first RAR in block 910, the UE monitors for the first RAR while the UE is in the idle mode using a RA-RNTI associated with a RACH preamble of another UE in block 924. For instance, referring to the Figures, UE 104 or NTN procedure component 1040 at block 602 may monitor RAR window 604 for DCI 610 while in idle mode 601, for example, by performing blind decoding using an RA-RNTI of one or more UEs 606 to demask a CRC appended to a possible DCI in potential PDCCH candidates at one or more aggregation levels. In some examples, the first RAR may be received in a NPDSCH, such as in the case where NTN 400 is deployed in a NB-IoT system. In some examples, the RAPIDs included in the first RAR, such as RAPIDs 612 in RAR 608, may be associated with one or more other UEs, such as UEs 606. In some examples, the first backoff duration for the first RACH preamble, such as backoff duration 616 applied prior to transmission of preamble 618, is different than a backoff duration indicated in the first RAR, such as the period of time for backoff generally denoted in a backoff indicator in RAR 504.

In some examples of block 902, when the UE performs the second procedure 906 in the idle mode, the UE transmits a second RACH preamble in block 914, and in block 916, the UE transmits another RACH preamble after a second backoff duration in response to: a failure to decode a second RAR responsive to transmission of the second RACH preamble, or a failure to decode a contention resolution message following reception of the second RAR. For instance, referring to the Figures, UE 104 or NTN procedure component 1040 may transmit preamble 502 while the UE is in idle mode 601, and in response to failing to decode the RAR 504 responsive to preamble 502, the UE 104 or NTN procedure component 1040 may transmit preamble 708 after waiting for backoff duration 706 to pass. Similarly, if the UE successfully decoded RAR 504 but failed to decode contention resolution message 508 responsive to uplink transmission 506 following reception of RAR 504, the UE 104 or NTN procedure component 1040 may transmit preamble 708 after waiting for backoff duration 706 to pass. In some examples, the second RACH preamble, such as preamble 502, may be transmitted in a NPRACH, such as in the case where NTN 400 is deployed in a NB-IoT system. In some examples, the second backoff duration, such as backoff duration 706, is between consecutive PRACH transmissions, such as between transmission of preamble 502 and transmission of preamble 708. For example, the PRACH or NPRACH occasions for preamble 502 and preamble 708 may be consecutive since the transmission occasion 704 within backoff duration 706 is skipped. In some examples, the second backoff duration, such as backoff duration 706, is randomized.

In some examples of block 902, when the UE performs the third procedure 908 in the connected mode, the UE monitors a USS for an uplink grant during a monitoring period in block 918, the UE transmits a third RACH preamble in response to a failure to receive the uplink grant during the monitoring period in block 920, and in block 922, the UE continues to monitor the USS for the uplink grant after transmitting the third RACH preamble until a start time of a RAR window for a third RAR responsive to the third RACH preamble. For instance, referring to the Figures, at block 808, UE 104 or NTN procedure component 1040 may monitor a USS for uplink grant 804 during the period of time 806, and in response to failing to receive uplink grant 804 during period of time 806, the UE 104 or NTN procedure component 1040 may transmit preamble 810. After transmitting preamble 810, at block 816, the UE 104 or NTN procedure component 1040 may continue to monitor the USS for uplink grant 804 until the start time 811 of RAR window 812 for RAR 814, where RAR 814 is responsive to preamble 810. In some examples, the third RACH preamble, such as preamble 810, is transmitted in a NPRACH, such as in the case where NTN 400 is deployed in a NB-IoT system. In some examples, the third RACH preamble is associated with a SR. For example, the preamble 810 may be transmitted to initiate an SR, such as in NB-IoT where preamble 810 may be transmitted in NPRACH in a message 1 that includes a bit or other indicator of SR 802. In some examples, when the UE performs the third procedure 908, after performing the operations of blocks 918, 920, and 922, the UE may receive the uplink grant in the USS using a C-RNTI associated with the UE in block 926, and in block 928, the UE may refrain from monitoring for the third RAR in response to receiving the uplink grant. For instance, referring to the Figures, after initiating a RACH procedure via transmission of preamble 810, the UE 104 or NTN procedure component 1040 may receive uplink grant 804 at block 816 in response to successfully demasking a CRC appended to the uplink grant 804 using C-RNTI during blind decoding of the USS within period of time 818. Afterwards, the UE 104 or NTN procedure component 1040 may abort the RACH procedure for example by disregarding reception of RAR 814, such as through refraining at block 822 from performing blind decoding for a DCI including resources of the RAR 814.

Figure 10:
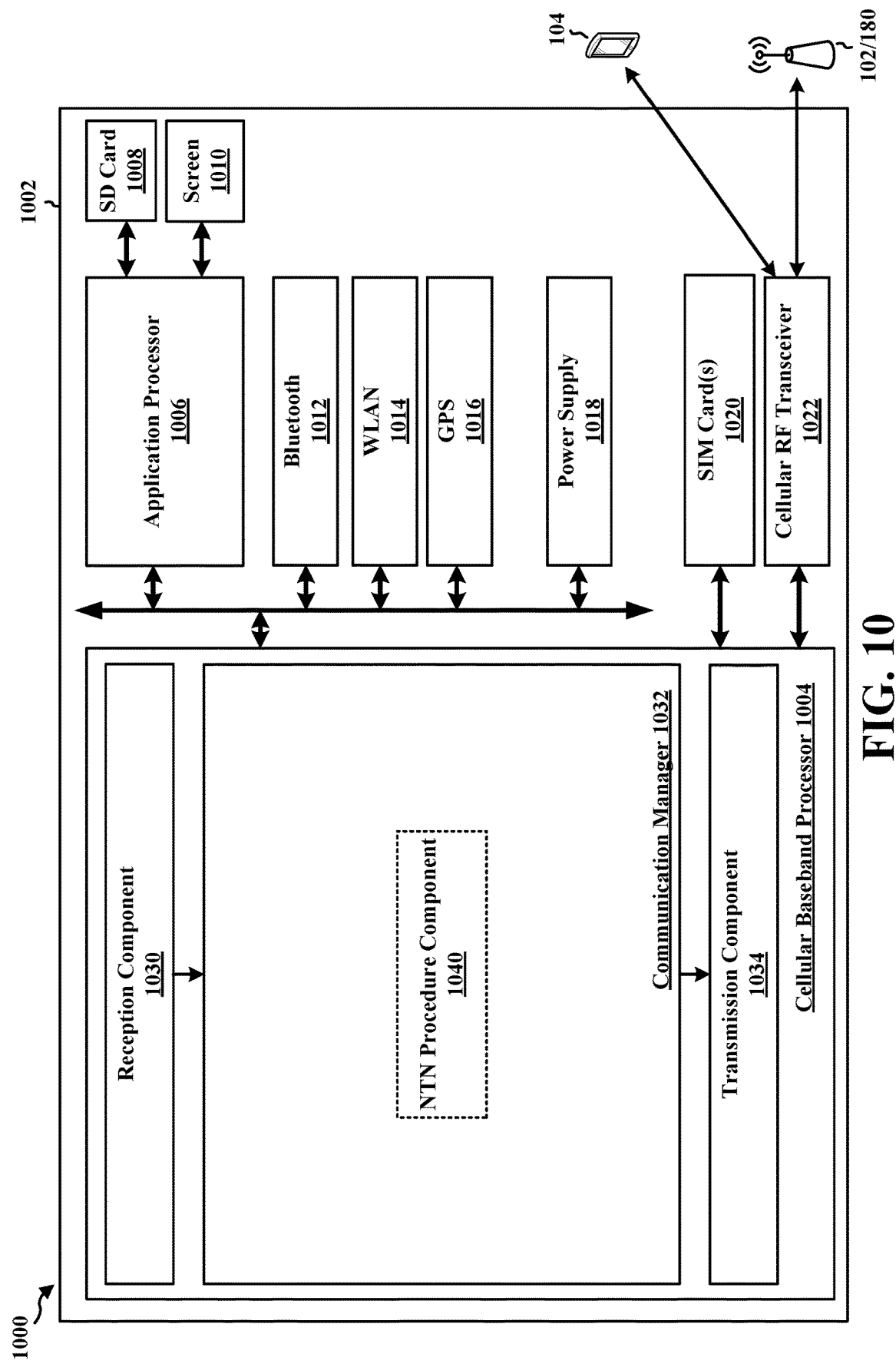
FIG. 10 is a diagram illustrating an example of a hardware implementation for a UE apparatus.

FIG. 10 is a diagram 1000 illustrating an example of a hardware implementation for an apparatus 1002 that performs optimized RACH procedures in NTN deployments such as in NTN NB-IoT deployments according to some aspects of the present disclosure. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 104, 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see UE 350 of FIG. 3) and include the aforediscussed additional modules of the apparatus 1002.

The communication manager 1032 includes a NTN procedure component 1040 that is configured to perform, in a NTN, one or more of a first procedure in an idle mode, a second procedure in the idle mode, or a third procedure in a connected mode, such as described in connection with block 902 including procedures 904, 906, and 908 of FIG. 9.

In one configuration for performing the first procedure, the NTN procedure component 1040 is configured to receive a first RAR via reception component 1030, such as described in connection with block 910 of FIG. 9, and transmit a first RACH preamble via transmission component 1034 after a first backoff duration in response to the first RAR including one or more RAPIDs meeting or exceeding a threshold quantity of RAPIDs, such as described in connection with block 912 of FIG. 9. For example, the reception component 1030 may be configured to receive, demodulate and decode the first RAR and provide the demodulated and decoded first RAR to the NTN procedure component 1040, where the reception, demodulation and decoding may be performed such as described in connection with FIG. 3. The NTN procedure component 1040 may then determine whether the first RAR including one or more RAPIDs meets or exceeds a threshold quantity of RAPIDs. In response to determining that the first RAR includes one or more RAPIDs meeting or exceeding the threshold quantity of RAPIDs, the NTN procedure component 1040 may wait a first backoff duration and then provide a first RACH preamble to the transmission component 1034. The transmission component 1034 may be configured to encode, modulate, and transmit the first RACH preamble, where the coding, modulation, and transmission may likewise be performed such as described in connection with FIG. 3. In some examples, the NTN procedure component 1040 is further configured to monitor for the first RAR while the apparatus is in the idle mode using a RA-RNTI associated with a RACH preamble of another apparatus, such as described in connection with block 924 of FIG. 9. For example, the NTN procedure component 1040 may determine an RA-RNTI associated with a RACH preamble of another UE, such as in response to receiving a preamble of another UE and calculating its associated RA-RNTI based on preamble timing. Afterwards, the NTN procedure component 1040 may provide the RA-RNTI to the reception component 1030, which in turn may attempt to blindly decode the CSS for the first RAR using the RA-RNTI during the RAR window.

In one configuration for performing the second procedure, the NTN procedure component 1040 is configured to transmit a second RACH preamble via transmission component 1034, such as described in connection with block 914 of FIG. 9, and transmit another RACH preamble via transmission component 1034 after a second backoff duration in response to a failure to decode a second RAR responsive to transmission of the second RACH preamble, or a failure to decode a contention resolution message following reception of the second RAR, such as described in connection with block 916 of FIG. 9. For example, the NTN procedure component 1040 may provide a second RACH preamble to the transmission component 1034. The transmission component 1034 may encode, modulate, and transmit the second RACH preamble such as described in connection with FIG. 3. After transmitting the second RACH preamble via transmission component 1034, the NTN procedure component 1040 may determine that a second RAR responsive to the second RACH preamble has not been decoded, or that a contention resolution message has not been decoded which was responsive to transmission of a message 3 following reception of a second RAR. In response to this determination, the NTN procedure component 1040 may wait a second backoff duration and then provide another RACH preamble to the transmission component 1034. The transmission component 1034 may then encode, modulate, and transmit the another RACH preamble such as described in connection with FIG. 3.

In one configuration for performing the third procedure, the NTN procedure component 1040 is configured to monitor a USS for an uplink grant during a monitoring period, such as described in connection with block 918 of FIG. 9, to transmit via transmission component 1034 a third RACH preamble in response to a failure to receive the uplink grant during the monitoring period, such as described in connection with block 920 of FIG. 9, and to continue to monitor the USS for the uplink grant after transmitting the third RACH preamble until a start time of a RAR window for a third RAR responsive to the third RACH preamble, such as described in connection with block 922 of FIG. 9. For example, the NTN procedure component 1040 may provide a C-RNTI to the reception component 1030, which in turn may attempt to blindly decode an uplink grant in a USS for a period of time. In response to failing to blindly decode and subsequently receive the uplink grant during this period of time, the NTN procedure component 1040 may provide a third RACH preamble to the transmission component 1034. The transmission component 1034 may then encode, modulate, and transmit the third RACH preamble such as described in connection with FIG. 3. After providing the third RACH preamble to the transmission component 1034, the NTN procedure component 1040 may determine the RTT between transmission of message 1 and reception of a subsequent message 2, and provide the RTT to the reception component 1030 to again attempt to blindly decode the uplink grant in the USS for another period of time corresponding to this RTT. In some examples, the NTN procedure component 1040 is further configured to receive the uplink grant via reception component 1030 in the USS using a C-RNTI associated with the apparatus, such as described in connection with block 926 of FIG. 9, and refrain from monitoring for the third RAR in response to receiving the uplink grant, such as described in connection with block 928 of FIG. 9. For example, after the third RACH preamble is transmitted, the reception component 1030 may receive, demodulate and decode the uplink grant such as described in connection with FIG. 3 and provide the demodulated and decoded uplink grant to the NTN procedure component 1040. The NTN procedure component 1040 may then abort the RACH procedure, such as in response to instructing reception component 1030 to refrain from blindly decoding the CSS for a RAR responsive to the third RACH preamble.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for performing, in a NTN, one or more of: a first procedure in an idle mode, the means for performing being configured to, in the first procedure: receive a first RAR; and transmit a first RACH preamble after a first backoff duration in response to the first RAR including one or more RAPIDs meeting or exceeding a threshold quantity of RAPIDs; or a second procedure in the idle mode, the means for performing being configured to, in the second procedure: transmit a second RACH preamble; and transmit another RACH preamble after a second backoff duration in response to: a failure to decode a second RAR responsive to transmission of the second RACH preamble, or a failure to decode a contention resolution message following reception of the second RAR; or a third procedure in a connected mode, the means for performing being configured to, in the third procedure: monitor a USS for an uplink grant during a monitoring period; transmit a third RACH preamble in response to a failure to receive the uplink grant during the monitoring period; and continue to monitor the USS for the uplink grant after transmitting the third RACH preamble until a start time of a RAR window for a third RAR responsive to the third RACH preamble. In some configurations where the means for performing is configured to perform the first procedure, the means for performing is further configured to monitor for the first RAR while the apparatus is in the idle mode using a random access RA-RNTI associated with a RACH preamble of another apparatus. In some configurations where the means for performing is configured to perform the third procedure, the means for performing is further configured to receive the uplink grant in the USS using a C-RNTI associated with the apparatus; and refrain from monitoring for the third RAR in response to receiving the uplink grant.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Clause 1. A method for wireless communication performable at a UE, comprising: performing, in a NTN, one or more of: a first procedure in an idle mode, the first procedure comprising: receiving a first RAR; and transmitting a first RACH preamble after a first backoff duration in response to the first RAR including one or more RAPIDs meeting or exceeding a threshold quantity of RAPIDs; or a second procedure in the idle mode, the second procedure comprising: transmitting a second RACH preamble; and transmitting another RACH preamble after a second backoff duration in response to: a failure to decode a second RAR responsive to transmission of the second RACH preamble, or a failure to decode a contention resolution message following reception of the second RAR; or a third procedure in a connected mode, the third procedure comprising: monitoring a USS for an uplink grant during a monitoring period; transmitting a third RACH preamble in response to a failure to receive the uplink grant during the monitoring period; and continuing to monitor the USS for the uplink grant after transmitting the third RACH preamble until a start time of a RAR window for a third RAR responsive to the third RACH preamble.

Clause 2. The method of clause 1, wherein first procedure is performed.

Clause 3. The method of clause 2, wherein the receiving the first RAR comprises: monitoring for the first RAR while the UE is in the idle mode using a RA-RNTI associated with a RACH preamble of another UE.

Clause 4. The method of clause 2 or clause 3, wherein the first RAR is received in a NPDSCH.

Clause 5. The method of any of clauses 2 to 4, wherein the RAPIDs included in the first RAR are associated with one or more other UEs.

Clause 6. The method of any of clauses 2 to 5, wherein the first backoff duration for the first RACH preamble is different than a backoff duration indicated in the first RAR.

Clause 7. The method of any of clauses 1 to 6, wherein the second procedure is performed.

Clause 8. The method of clause 7, wherein the second RACH preamble is transmitted in a NPRACH.

Clause 9. The method of clause 7 or clause 8, wherein the second backoff duration is between consecutive PRACH transmissions.

Clause 10. The method of any of clauses 7 to 9, wherein the second backoff duration is randomized.

Clause 11. The method of any of clauses 7 to 10, wherein the second procedure is performed before or after the first procedure.

Clause 12. The method of any of clauses 1 to 11, wherein the third procedure is performed.

Clause 13. The method of clause 12, wherein the third RACH preamble is transmitted in a NPRACH.

Clause 14. The method of clause 12 or clause 13, wherein the third RACH preamble is associated with a SR.

Clause 15. The method of any of clauses 12 to 14, further comprising: receiving the uplink grant in the USS using a C-RNTI associated with the UE; and refraining from monitoring for the third RAR in response to receiving the uplink grant.

Clause 16. The method of any of clauses 12 to 15, wherein the third procedure is performed: before or after the first procedure; before or after the second procedure; before the first procedure and the second procedure; or after the first procedure and the second procedure.

Clause 17. An apparatus for wireless communication, comprising: a memory; and a processor communicatively coupled with the memory, the processor operable to cause the apparatus to: perform, in a NTN, one or more of: a first procedure in an idle mode, the processor being operable to cause the apparatus to, in the first procedure: receive a first RAR; and transmit a first RACH preamble after a first backoff duration in response to the first RAR including one or more RAPIDs meeting or exceeding a threshold quantity of RAPIDs; or a second procedure in the idle mode, the processor being operable to cause the apparatus to, in the second procedure: transmit a second RACH preamble; and transmit another RACH preamble after a second backoff duration in response to: a failure to decode a second RAR responsive to transmission of the second RACH preamble, or a failure to decode a contention resolution message following reception of the second RAR; or a third procedure in a connected mode, the processor being operable to cause the apparatus to, in the third procedure: monitor a USS for an uplink grant during a monitoring period; transmit a third RACH preamble in response to a failure to receive the uplink grant during the monitoring period; and continue to monitor the USS for the uplink grant after transmitting the third RACH preamble until a start time of a RAR window for a third RAR responsive to the third RACH preamble.

Clause 18. The apparatus of clause 17, wherein the processor is operable to cause the apparatus to perform the first procedure.

Clause 19. The apparatus of clause 18, wherein to receive the first RAR, the processor is operable to cause the apparatus to: monitor for the first RAR while the apparatus is in the idle mode using a RA-RNTI associated with a RACH preamble of another apparatus.

Clause 20. The apparatus of any of clauses 17 to 19, wherein the processor is operable to cause the apparatus to perform the second procedure.

Clause 21. The apparatus of clause 20, wherein the processor is operable to cause the apparatus to perform the second procedure before or after the first procedure.

Clause 22. The apparatus of any of clauses 17 to 21, wherein the processor is operable to cause the apparatus to perform the third procedure.

Clause 23. The apparatus of clause 22, wherein the processor is further operable to cause the apparatus to receive the uplink grant in the USS using a cell radio network temporary identifier (C-RNTI) associated with the apparatus; and refrain from monitoring for the third RAR in response to receiving the uplink grant.

Clause 24. The apparatus of clause 22 or clause 23, wherein the processor is operable to cause the apparatus to perform the third procedure: before or after the first procedure; before or after the second procedure; before the first procedure and the second procedure; or after the first procedure and the second procedure.

Clause 25. An apparatus for wireless communication, comprising: means for performing, in a NTN, one or more of: a first procedure in an idle mode, the means for performing being configured to, in the first procedure: receive a first RAR; and transmit a first RACH preamble after a first backoff duration in response to the first RAR including one or more RAPIDs meeting or exceeding a threshold quantity of RAPIDs; or a second procedure in the idle mode, the means for performing being configured to, in the second procedure: transmit a second RACH preamble; and transmit another RACH preamble after a second backoff duration in response to: a failure to decode a second RAR responsive to transmission of the second RACH preamble, or a failure to decode a contention resolution message following reception of the second RAR; or a third procedure in a connected mode, the means for performing being configured to, in the third procedure: monitor a USS for an uplink grant during a monitoring period; transmit a third RACH preamble in response to a failure to receive the uplink grant during the monitoring period; and continue to monitor the USS for the uplink grant after transmitting the third RACH preamble until a start time of a RAR window for a third RAR responsive to the third RACH preamble.

Clause 26. The apparatus of clause 25, wherein the means for performing is configured to perform the first procedure, and to receive the first RAR, the means for performing is further configured to: monitor for the first RAR while the apparatus is in the idle mode using a RA-RNTI associated with a RACH preamble of another apparatus.

Clause 27. The apparatus of clause 25 or clause 26, wherein the means for performing is configured to perform the second procedure before or after the first procedure.

Clause 28. The apparatus of any of clauses 25 to 27, wherein the means for performing is configured to perform the third procedure, the means for performing being further configured to: receive the uplink grant in the USS using a C-RNTI associated with the apparatus; and refrain from monitoring for the third RAR in response to receiving the uplink grant.

Clause 29. The apparatus of any of clauses 25 to 28, wherein the means for performing is configured to perform the third procedure: before or after the first procedure; before or after the second procedure; before the first procedure and the second procedure; or after the first procedure and the second procedure.

Clause 30. A non-transitory, computer-readable medium comprising computer executable code, the code when executed by a processor causes the processor to: perform, in a NTN, one or more of: a first procedure in an idle mode, the code when executed by the processor causes the processor to, in the first procedure: receive a first RAR; and transmit a first RACH preamble after a first backoff duration in response to the first RAR including one or more RAPIDs meeting or exceeding a threshold quantity of RAPIDs; or a second procedure in the idle mode, the code when executed by the processor causes the processor to, in the second procedure: transmit a second RACH preamble; and transmit another RACH preamble after a second backoff duration in response to: a failure to decode a second RAR responsive to transmission of the second RACH preamble, or a failure to decode a contention resolution message following reception of the second RAR; or a third procedure in a connected mode, the code when executed by the processor causes the processor to, in the third procedure: monitor a USS for an uplink grant during a monitoring period; transmit a third RACH preamble in response to a failure to receive the uplink grant during the monitoring period; and continue to monitor the USS for the uplink grant after transmitting the third RACH preamble until a start time of a RAR window for a third RAR responsive to the third RACH preamble.

What is claimed is:

1. A method for wireless communication performable at a user equipment (UE), comprising:
   performing, in a non-terrestrial network (NTN),
      a first procedure in an idle mode, the first procedure comprising:
         receiving a first random access response (RAR); and
         transmitting a first random access channel (RACH) preamble after a first backoff duration in response to the first RAR including one or more random access preamble identifiers (RAPIDs) meeting or exceeding a threshold quantity of RAPIDs, wherein the RAPIDs included in the first RAR are associated with one or more other UEs.

2. The method of claim 1, wherein the receiving the first RAR comprises:
   monitoring for the first RAR while the UE is in the idle mode using a random access radio network temporary identifier (RA-RNTI) associated with a RACH preamble of another UE.

3. The method of claim 1, wherein the first RAR is received in a narrowband physical downlink shared channel (NPDSCH).

4. The method of claim 1, wherein the first backoff duration for the first RACH preamble is different than a backoff duration indicated in the first RAR.

5. The method of claim 1, further comprising:
   performing, in the NTN, a second procedure in the idle mode, the second procedure comprising:
      transmitting a second RACH preamble; and
      transmitting another RACH preamble after a second backoff duration in response to:
         a failure to decode a second RAR responsive to transmission of the second RACH preamble, or
         a failure to decode a contention resolution message following reception of the second RAR.

6. The method of claim 5, wherein the second RACH preamble is transmitted in a narrowband physical RACH (NPRACH).

7. The method of claim 5, wherein the second backoff duration is between consecutive physical RACH (PRACH) transmissions.

8. The method of claim 5, wherein the second backoff duration is randomized.

9. The method of claim 5, wherein the second procedure is performed before or after the first procedure.

10. The method of claim 1, further comprising:
    performing, in the NTN, a third procedure in a connected mode, the third procedure comprising:
       monitoring a user-specific search space (USS) for an uplink grant during a monitoring period;
       transmitting a third RACH preamble in response to a failure to receive the uplink grant during the monitoring period; and
       continuing to monitor the USS for the uplink grant after transmitting the third RACH preamble until a start time of a RAR window for a third RAR responsive to the third RACH preamble.

11. The method of claim 10, wherein the third RACH preamble is transmitted in a narrowband physical RACH (NPRACH).

12. The method of claim 10, wherein the third RACH preamble is associated with a scheduling request (SR).

13. The method of claim 10, further comprising:
    receiving the uplink grant in the USS using a cell radio network temporary identifier (C-RNTI) associated with the UE; and
    refraining from monitoring for the third RAR in response to receiving the uplink grant.

14. The method of claim 10, further comprising:
    performing, in the NTN, a second procedure in the idle mode, the second procedure comprising:
       transmitting a second RACH preamble; and
       transmitting another RACH preamble after a second backoff duration in response to:
          a failure to decode a second RAR responsive to transmission of the second RACH preamble, or
          a failure to decode a contention resolution message following reception of the second RAR;
    wherein the third procedure is performed:
       before or after the first procedure;
       before or after the second procedure;
       before the first procedure and the second procedure; or
       after the first procedure and the second procedure.

15. An apparatus for wireless communication, comprising:
    at least one memory; and
    one or more processors communicatively coupled with the at least one memory, the one or more processors operable to cause the apparatus to:
    perform, in a non-terrestrial network (NTN),
       a first procedure in an idle mode, the one or more processors being operable to cause the apparatus to, in the first procedure:
          receive a first random access response (RAR); and
          transmit a first random access channel (RACH) preamble after a first backoff duration in response to the first RAR including one or more random access preamble identifiers (RAPIDs) meeting or exceeding a threshold quantity of RAPIDs, wherein the apparatus is a user equipment (UE), and the RAPIDs included in the first RAR are associated with one or more other UEs.

16. The apparatus of claim 15, wherein to receive the first RAR, the one or more processors are operable to cause the apparatus to:

monitor for the first RAR while the apparatus is in the idle mode using a random access radio network temporary identifier (RA-RNTI) associated with a RACH preamble of another apparatus.

17. The apparatus of claim 15, wherein the one or more processors are further operable to cause the apparatus to:
perform, in the NTN, a second procedure in the idle mode, the one or more processors being operable to cause the apparatus to, in the second procedure:
transmit a second RACH preamble; and
transmit another RACH preamble after a second backoff duration in response to:
a failure to decode a second RAR responsive to transmission of the second RACH preamble, or
a failure to decode a contention resolution message following reception of the second RAR.

18. The apparatus of claim 17, wherein the one or more processors are operable to cause the apparatus to perform the second procedure before or after the first procedure.

19. The apparatus of claim 15, wherein the one or more processors are further operable to cause the apparatus to:
perform, in the NTN, a third procedure in a connected mode, the one or more processors being operable to cause the apparatus to, in the third procedure:
monitor a user-specific search space (USS) for an uplink grant during a monitoring period;
transmit a third RACH preamble in response to a failure to receive the uplink grant during the monitoring period; and
continue to monitor the USS for the uplink grant after transmitting the third RACH preamble until a start time of a RAR window for a third RAR responsive to the third RACH preamble.

20. The apparatus of claim 19, wherein the one or more processors are further operable to cause the apparatus to;
receive the uplink grant in the USS using a cell radio network temporary identifier (C-RNTI) associated with the apparatus; and
refrain from monitoring for the third RAR in response to receiving the uplink grant.

21. The apparatus of claim 19, wherein the one or more processors are further operable to cause the apparatus to:
perform, in the NTN, a second procedure in the idle mode, the one or more processors being operable to cause the apparatus to, in the second procedure:
transmit a second RACH preamble; and
transmit another RACH preamble after a second backoff duration in response to:
a failure to decode a second RAR responsive to transmission of the second RACH preamble, or
a failure to decode a contention resolution message following reception of the second RAR;
wherein the one or more processors are operable to cause the apparatus to perform the third procedure:
before or after the first procedure;
before or after the second procedure;
before the first procedure and the second procedure; or
after the first procedure and the second procedure.

22. An apparatus for wireless communication, comprising:
means for performing, in a non-terrestrial network (NTN), a first procedure in an idle mode, the means for performing being configured to, in the first procedure:
receive a first random access response (RAR); and
transmit a first random access channel (RACH) preamble after a first backoff duration in response to the first RAR including one or more random access preamble identifiers (RAPIDs) meeting or exceeding a threshold quantity of RAPIDs, wherein the apparatus is a user equipment (UE), and the RAPIDs included in the first RAR are associated with one or more other UEs.

23. The apparatus of claim 22, wherein the means for performing is configured to perform the first procedure, and to receive the first RAR, the means for performing is further configured to:
monitor for the first RAR while the apparatus is in the idle mode using a random access radio network temporary identifier (RA-RNTI) associated with a RACH preamble of another apparatus.

24. The apparatus of claim 22, wherein the means for performing is further configured to:
perform, in the NTN, a second procedure in the idle mode, the means for performing being configured to, in the second procedure:
transmit a second RACH preamble; and
transmit another RACH preamble after a second backoff duration in response to:
a failure to decode a second RAR responsive to transmission of the second RACH preamble, or
a failure to decode a contention resolution message following reception of the second RAR;
wherein the means for performing is configured to perform the second procedure before or after the first procedure.

25. The apparatus of claim 22, wherein the means for performing is further configured to:
perform, in the NTN, a third procedure in a connected mode, the means for performing being configured to, in the third procedure:
monitor a user-specific search space (USS) for an uplink grant during a monitoring period;
transmit a third RACH preamble in response to a failure to receive the uplink grant during the monitoring period; and
continue to monitor the USS for the uplink grant after transmitting the third RACH preamble until a start time of a RAR window for a third RAR responsive to the third RACH preamble;
wherein the means for performing is further configured to:
receive the uplink grant in the USS using a cell radio network temporary identifier (C-RNTI) associated with the apparatus; and
refrain from monitoring for the third RAR in response to receiving the uplink grant.

26. The apparatus of claim 22, wherein the means for performing is further configured to:
perform, in the NTN, a second procedure in the idle mode, the means for performing being configured to, in the second procedure:
transmit a second RACH preamble; and
transmit another RACH preamble after a second backoff duration in response to:
a failure to decode a second RAR responsive to transmission of the second RACH preamble, or
a failure to decode a contention resolution message following reception of the second RAR; and
perform, in the NTN, a third procedure in a connected mode, the means for performing being configured to, in the third procedure:
monitor a user-specific search space (USS) for an uplink grant during a monitoring period;

transmit a third RACH preamble in response to a failure to receive the uplink grant during the monitoring period; and continue to monitor the USS for the uplink grant after transmitting the third RACH preamble until a start time of a RAR window for a third RAR responsive to the third RACH preamble;

wherein the means for performing is configured to perform the third procedure:

before or after the first procedure;

before or after the second procedure;

before the first procedure and the second procedure; or after the first procedure and the second procedure.

27. A non-transitory, computer-readable medium comprising computer executable code, the code when executed by one or more processors causes the one or more processors to:

perform, in a non-terrestrial network (NTN), a first procedure in an idle mode, the code when executed by the one or more processors causes the one or more processors to, in the first procedure:

receive a first random access response (RAR); and transmit a first random access channel (RACH) preamble after a first backoff duration in response to the first RAR including one or more random access preamble identifiers (RAPIDs) meeting or exceeding a threshold quantity of RAPIDs, wherein the one or more processors are of a user equipment (UE), and the RAPIDs included in the first RAR are associated with one or more other UEs.

\* \* \* \* \*